H. A. MARTIN.
CASH REGISTER.
APPLICATION FILED MAR. 6, 1912.
1,206,878.
Patented Dec. 5, 1916.
13 SHEETS—SHEET 5.
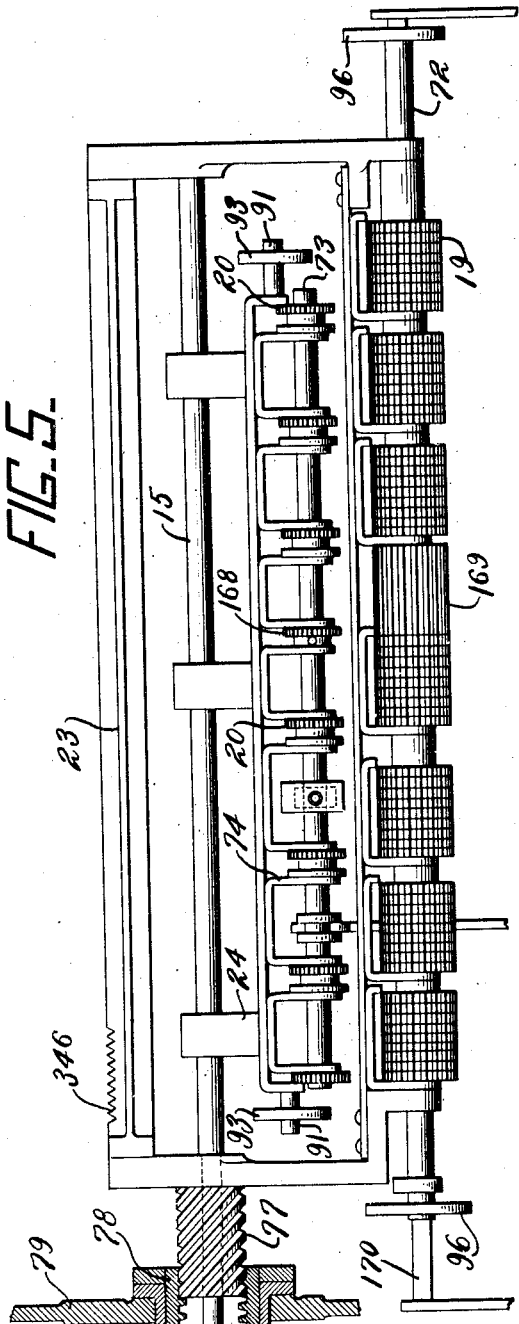
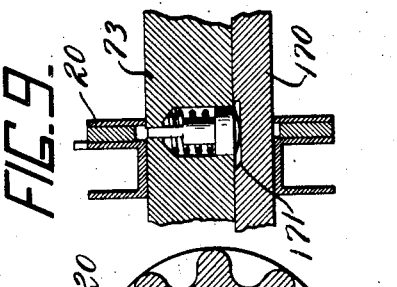
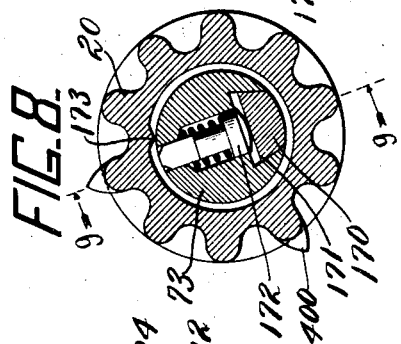
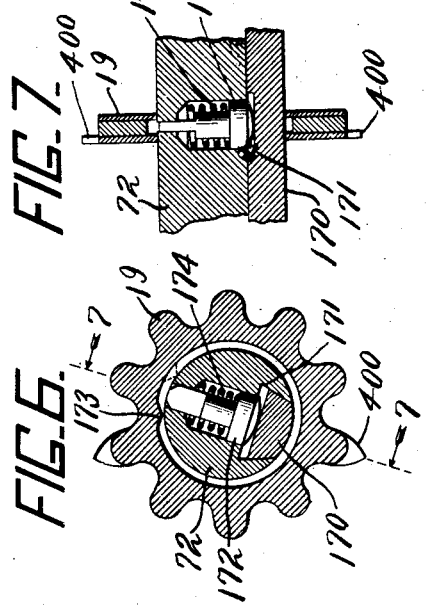
Witnesses
H. F. Sadgebury
R. Cummins
Inventor
Haakon A. Martin
by R. Arlan
and C. H. Braselton
Attorneys

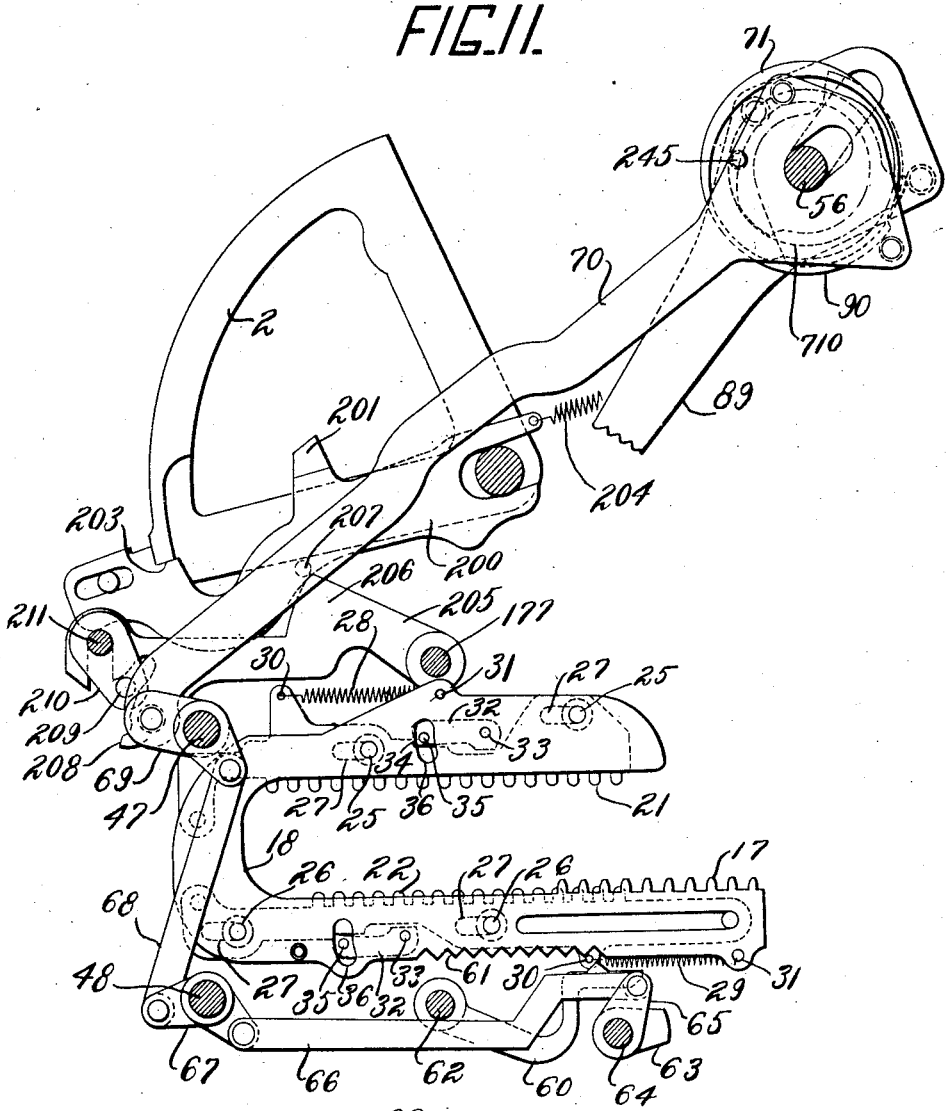

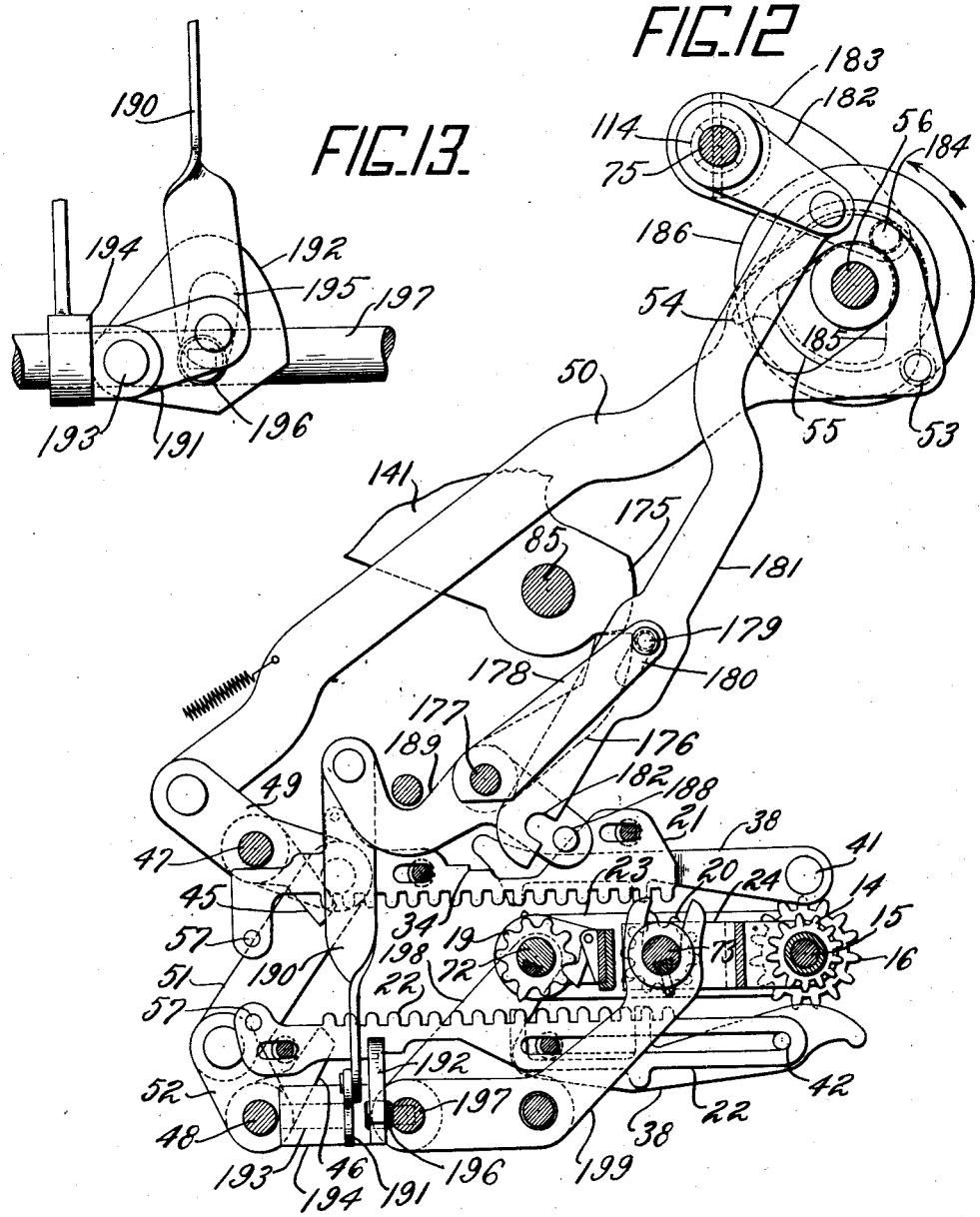

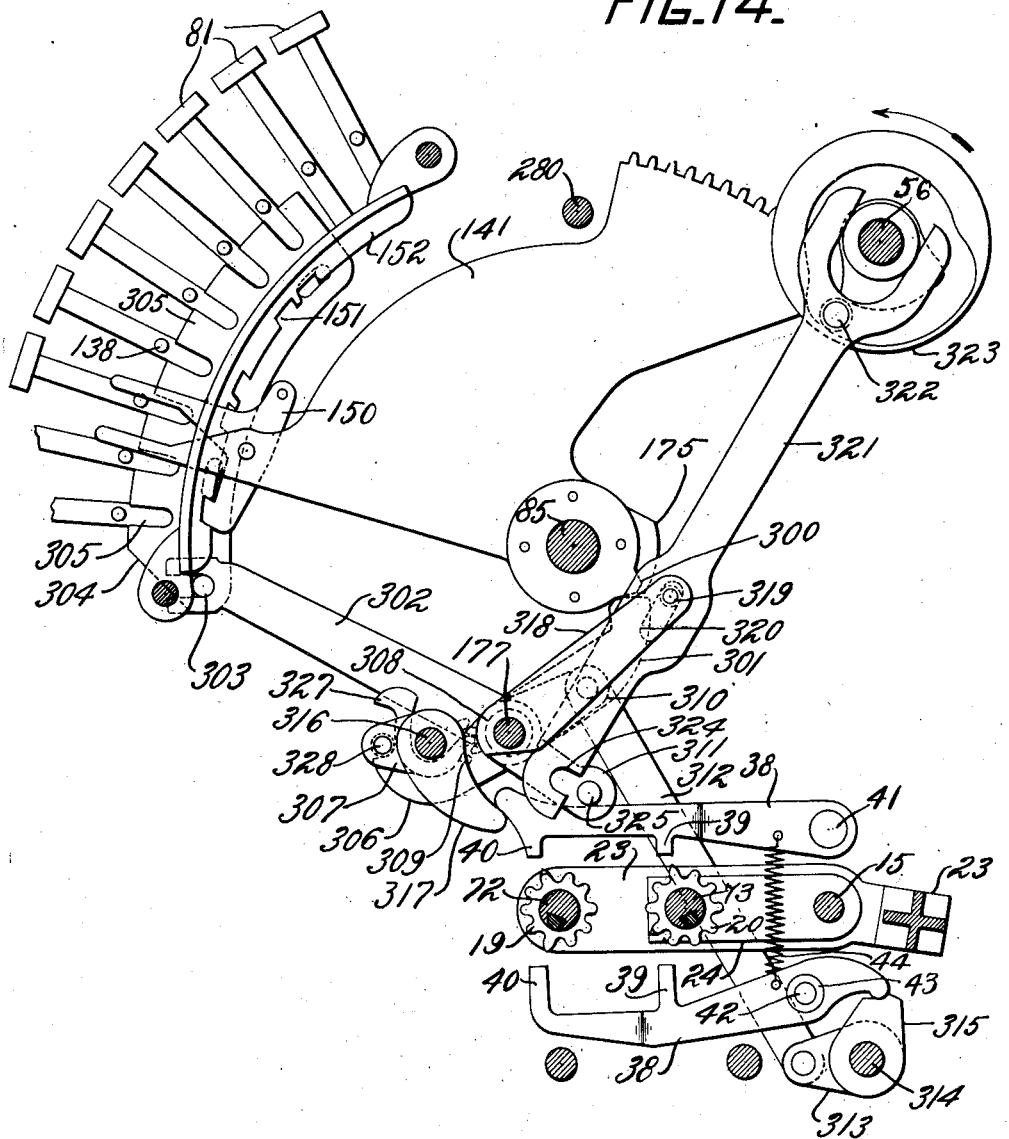

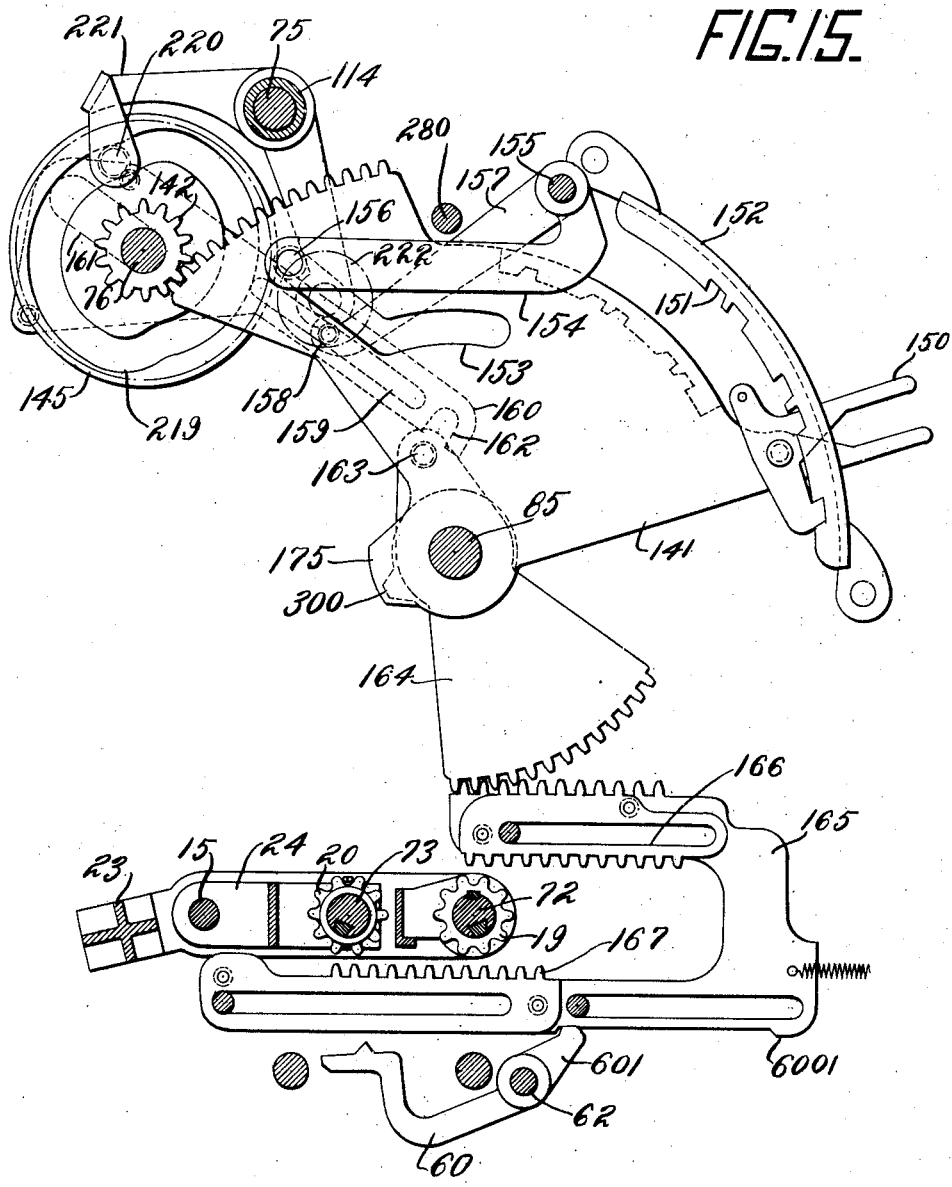

H. A. MARTIN.
CASH REGISTER.
APPLICATION FILED MAR. 6, 1912.

1,206,878.

Patented Dec. 5, 1916.
13 SHEETS—SHEET 11.

Witnesses
H. F. Sadgebury
R. Rummler

Inventor
Haakon A. Martin
by R. Chlam
and C. H. Braulton
Attorneys

H. A. MARTIN.
CASH REGISTER.
APPLICATION FILED MAR. 6, 1912.

1,206,878.

Patented Dec. 5, 1916.
13 SHEETS—SHEET 12.

Witnesses
H. F. Sadgrbury

Inventor
Haakon A. Martin
Attorneys

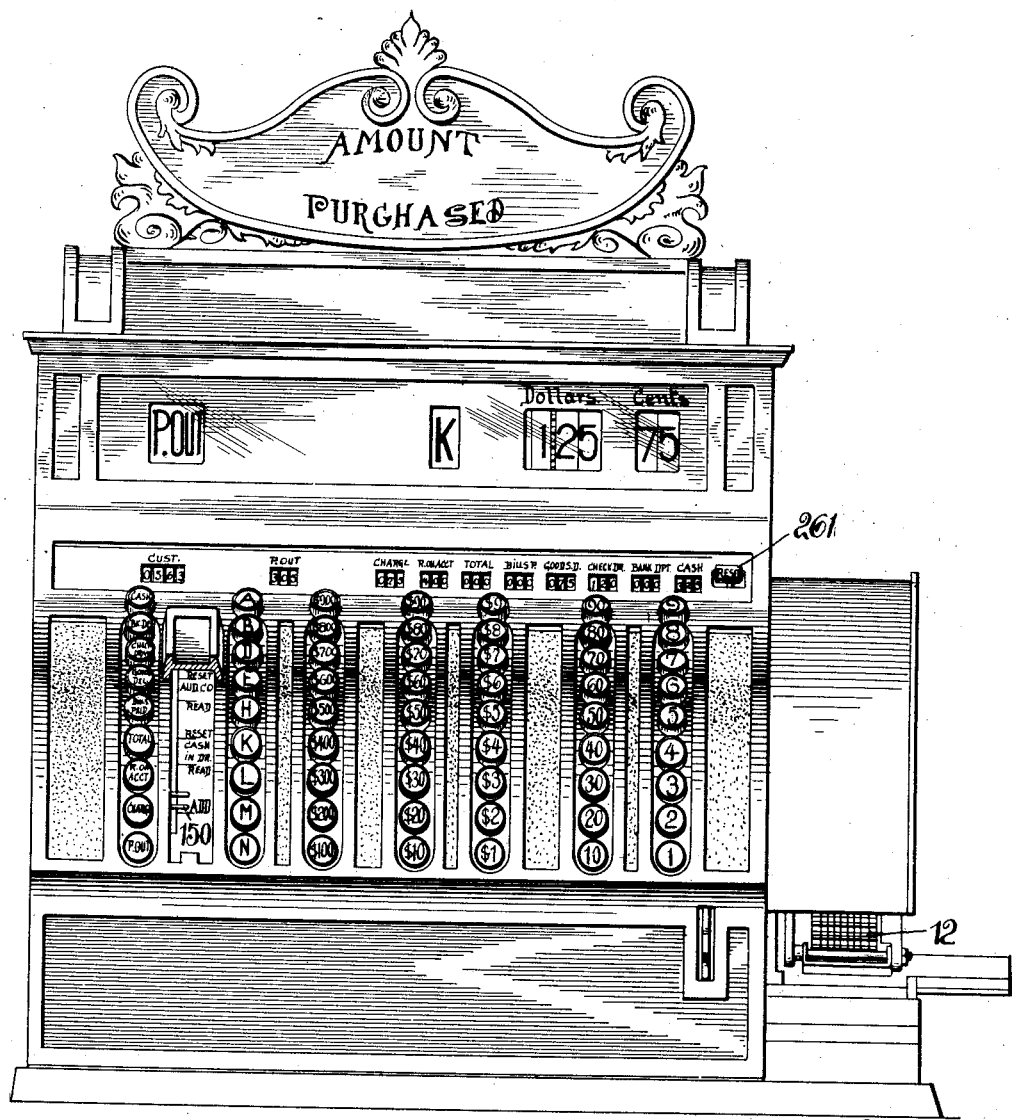

UNITED STATES PATENT OFFICE.

HAAKON A. MARTIN, OF DAYTON, OHIO, ASSIGNOR TO THE NATIONAL CASH REGISTER COMPANY, INCORPORATED IN 1906, OF DAYTON, OHIO, A CORPORATION OF OHIO.

CASH-REGISTER.

1,206,878.      Specification of Letters Patent.      Patented Dec. 5, 1916.

Application filed March 6, 1912. Serial No. 681,922.

*To all whom it may concern:*

Be it known that I, HAAKON A. MARTIN, a subject of the King of Norway, residing at Dayton, in the county of Montgomery and State of Ohio, have invented certain new and useful Improvements in Cash-Registers, of which I declare the following to be a full, clear, and exact description.

Among the objects of the invention are to provide a positively operated cash register having an improved construction whereby totals and subtotals may be printed from a plurality of totalizers.

Another object of the invention is to provide an improved construction wherein different accounting devices may be operated simultaneously to add and subtract the same amounts.

Another object of the invention is to provide an improved means for resetting simultaneously a plurality of counting devices by an operation of the machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
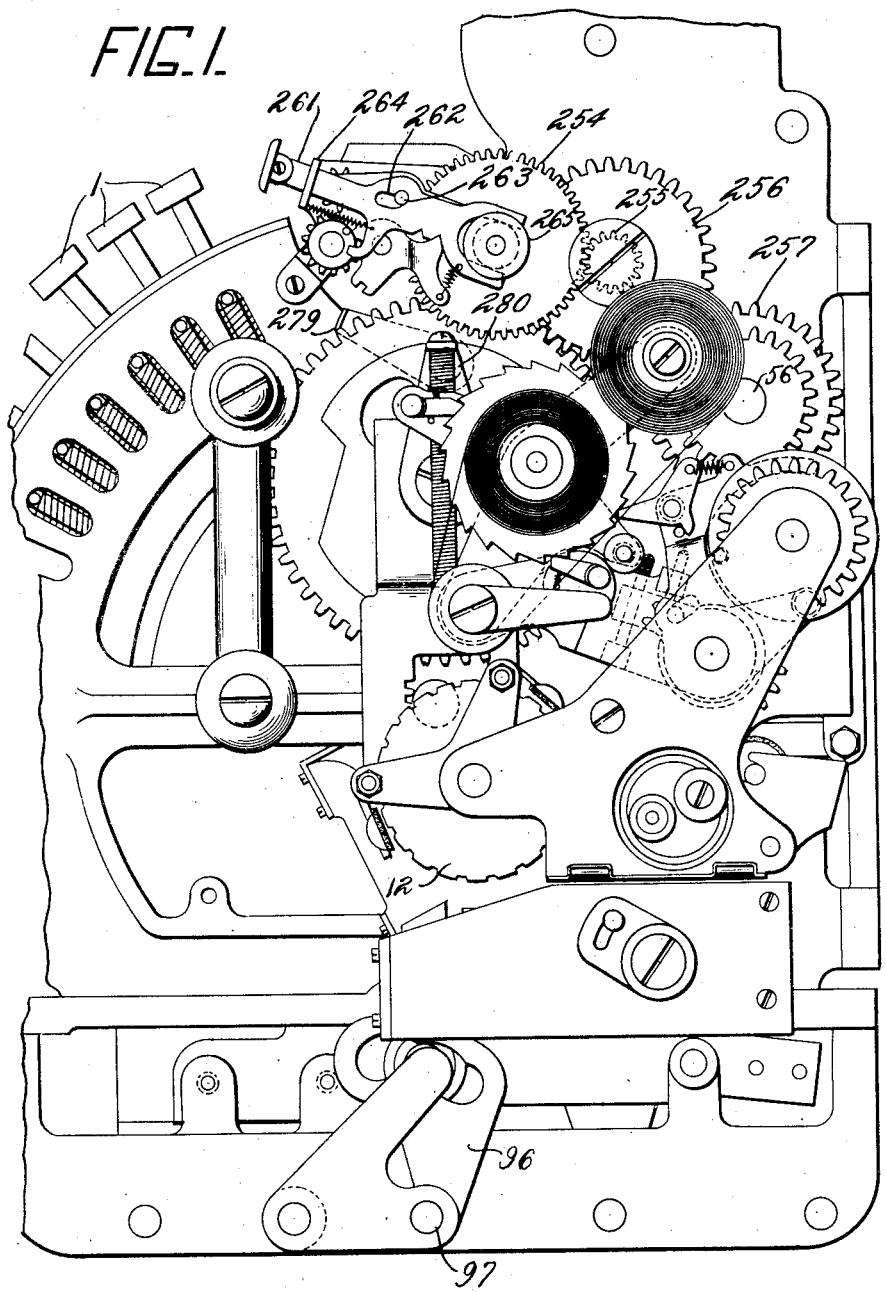
Figure 2:
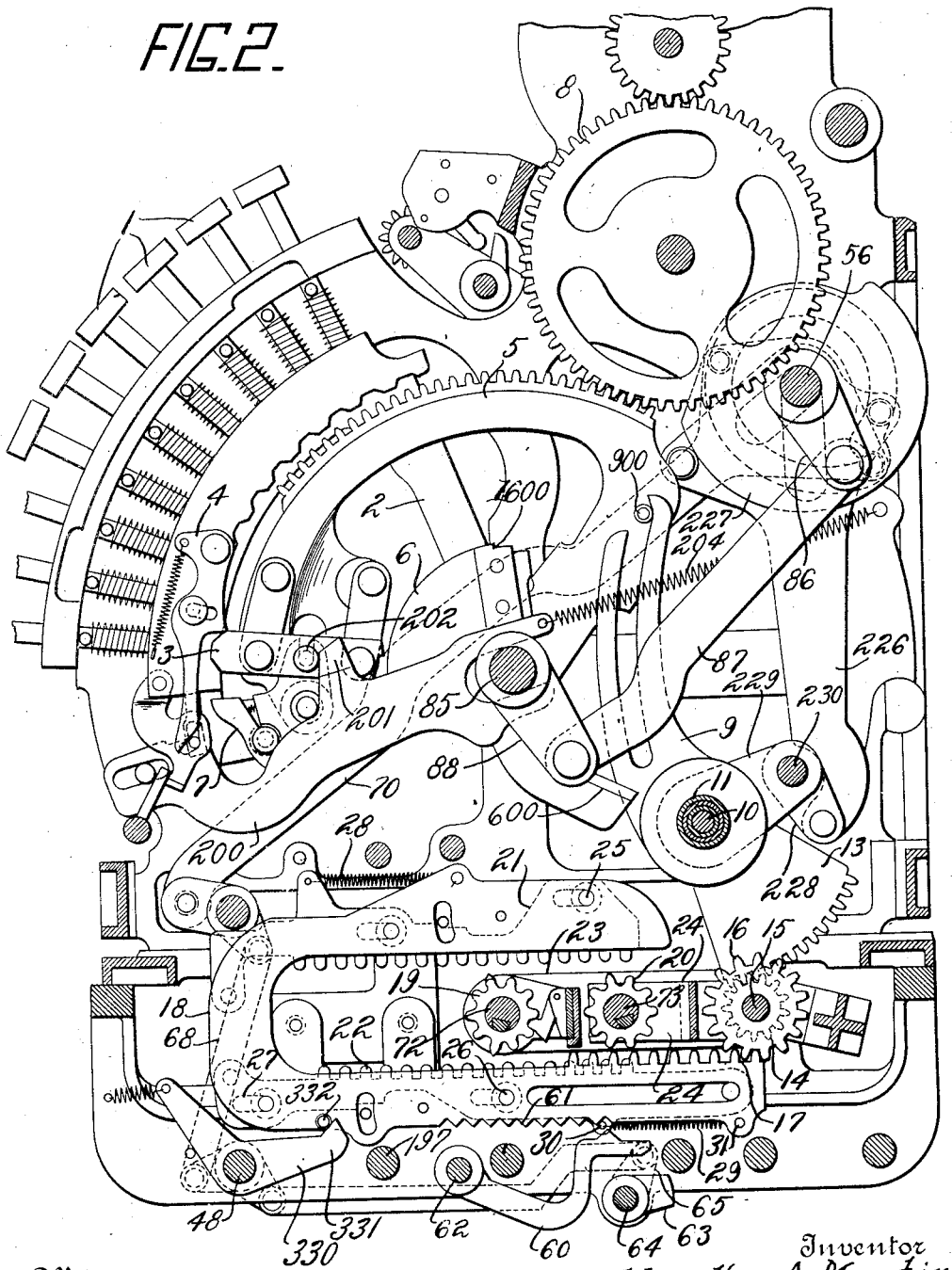
Figure 3:
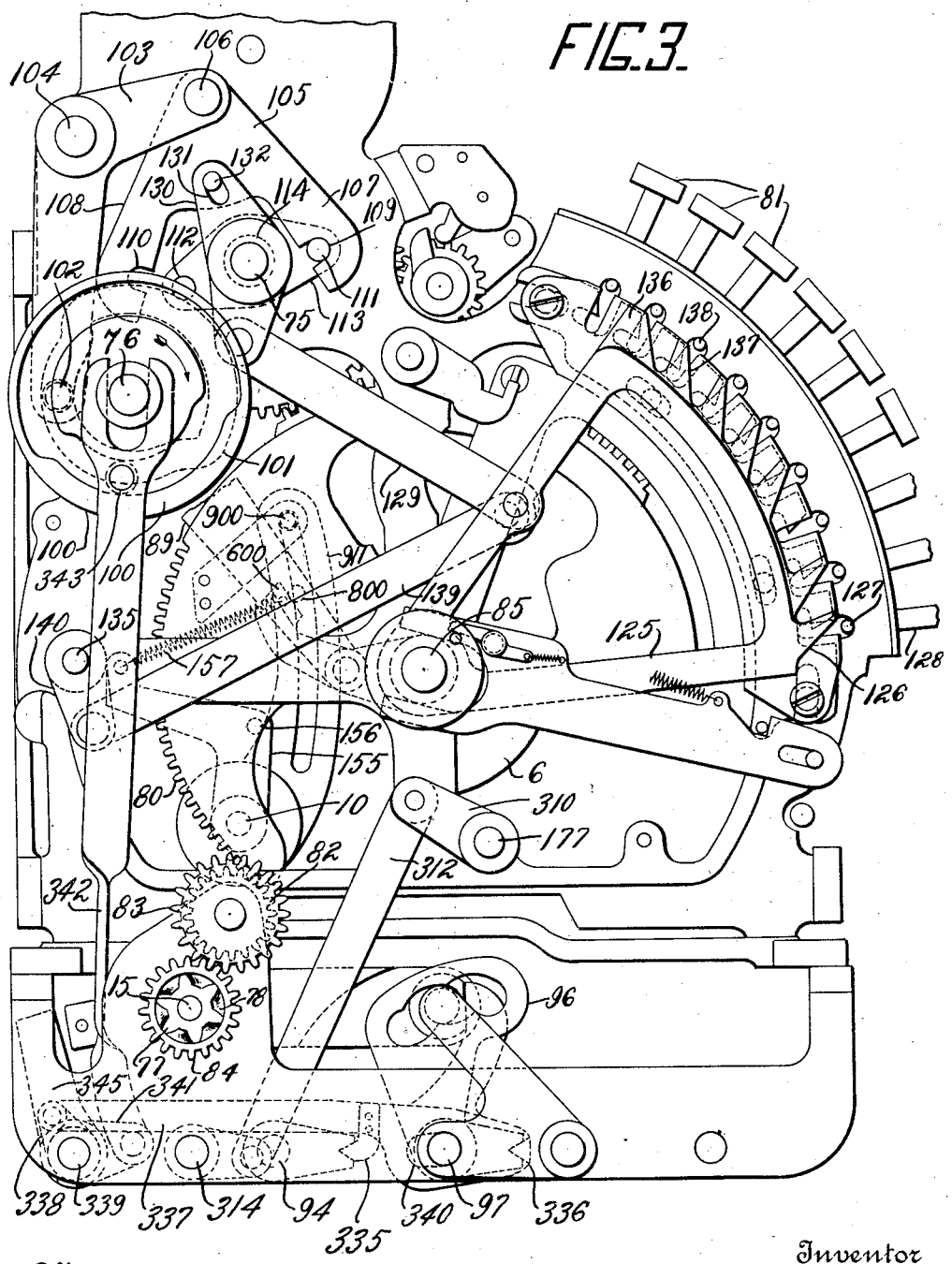
Figure 4:
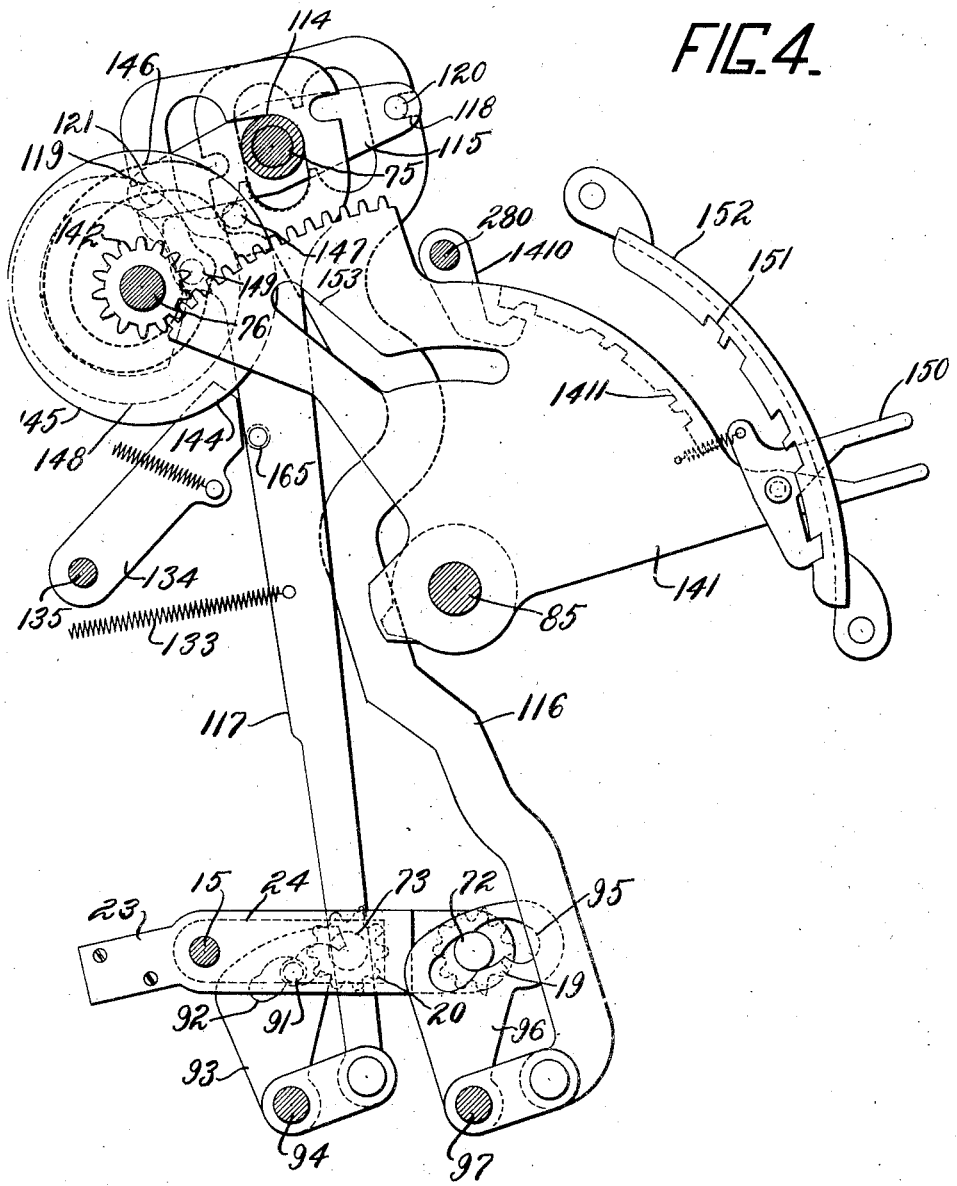
Figure 16:
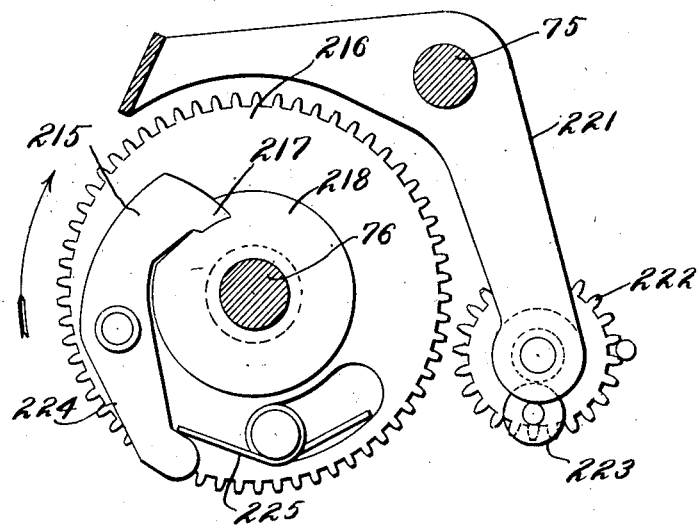
Figure 17:
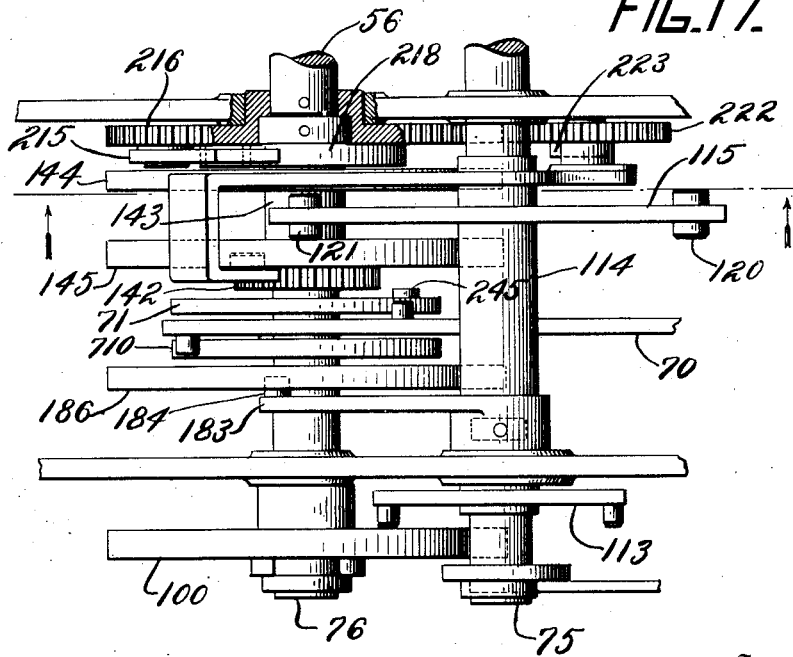
Figure 18:
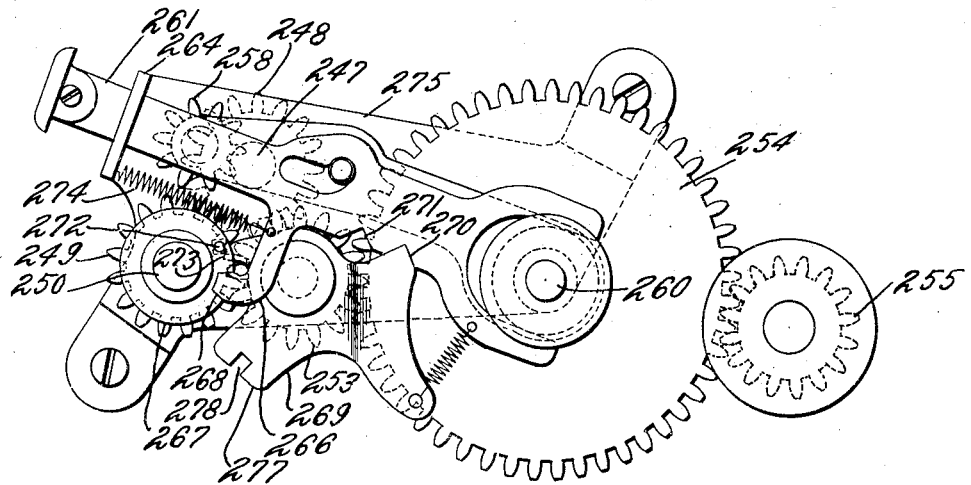
Figure 19:
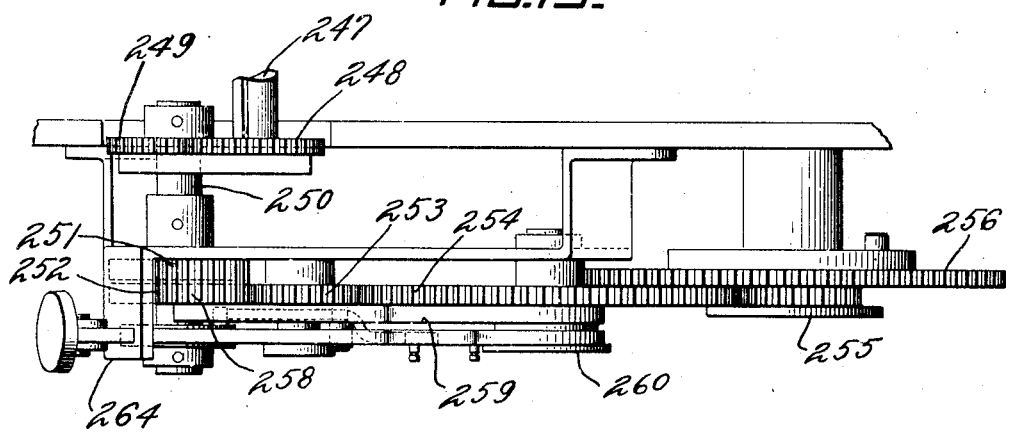
Figure 20:
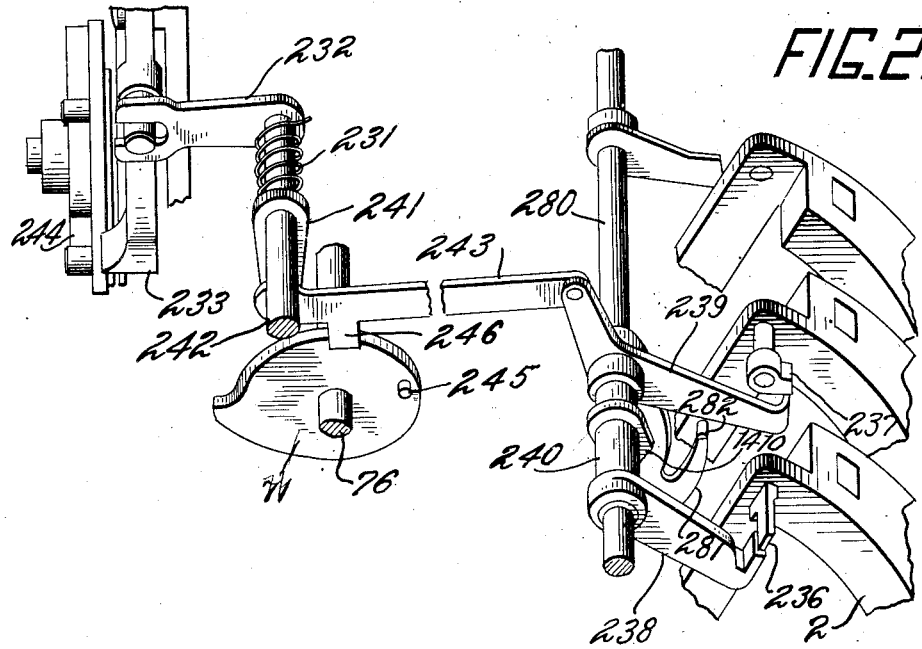
Figure 21:
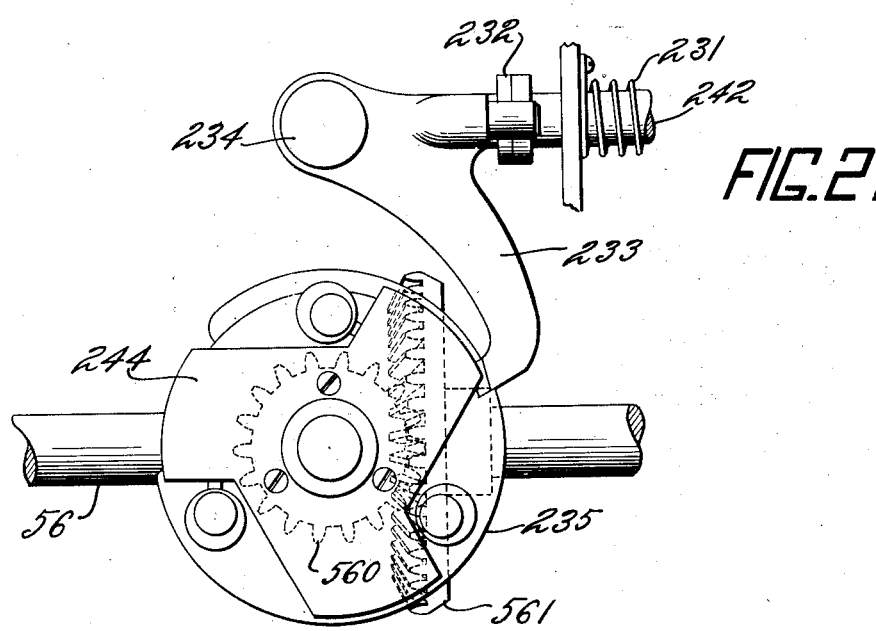

Figure 1 is a right side elevation with the cabinet removed of a cash register constructed according to the invention. Fig. 2 is a transverse vertical section of the machine showing the main operating mechanism and totalizing devices controlled thereby. Fig. 3 is a left side elevation of the machine with the cabinet removed. Fig. 4 is a detail in left side elevation of a manually controlled device for setting the mechanism to print totals and subtotals. Fig. 5 is a top plan of the main or "balance cash" and special transaction totalizers. Fig. 6 is a sectional detail of one of the transaction totalizer pinions. Fig. 7 is a sectional view taken on the line 7—7 of Fig. 6. Fig. 8 is a sectional view of one of the main totalizer pinions. Fig. 9 is a sectional view taken on the line 9—9 of Fig. 8. Fig. 10 is a perspective detail of transfer devices controlled by the totalizers. Fig. 11 is a detail in right side elevation of a totalizer operating rack and its alining means; also showing means to prevent depression of any value keys at totalizing operations. Fig. 12 is a detail in left side elevation showing the totalizers in section and their operating racks, and the mechanism for setting parts for resetting and total printing operations. Fig. 13 is a detail in front elevation of part of the mechanism for shifting the totalizer splines. Fig. 14 is a detail in left side elevation of an interlock between the totalizing lever and the transaction keys. Fig. 15 is a detail in right side elevation of the manually operated lever and its connections for causing resetting of the totalizers. Fig. 16 is a sectional detail in right side elevation of a clutch effective in taking subtotals. Fig. 17 is a plan view of the mechanism shown in Fig. 16 and also includes other related devices. Fig. 18 is a detail in right side elevation of devices for connecting the counters with the main operating mechanism, whereby the counters are reset. Fig. 19 is a plan view of the mechanism shown in Fig. 18. Fig. 20 is a perspective view of the motor controlling devices. Fig. 21 is a fragmentary rear elevation of the motor clutch. Fig. 22 is a plan view of the front of the machine inclosed in its casing and showing the general arrangement of the keyboard and indicating mechanisms, a portion of the cabinet being broken away to show the adjusting lever for reading and resetting the various totalizers.

The invention is shown applied to a cash register of the type shown in the patent to Cleal and Reinhard granted April 13, 1897, No. 580,378, patent to Thomas Carroll granted March 8, 1904, No. 754,049, and in an application for patent on cash registers of E. J. Von Pein filed May 26, 1909, Serial No. 498,548. It is an improvement of the machine shown in the copending application for patent on cash registers of H. A. Martin filed November 19, 1910, Serial No. 593,202.

The greater part of the construction, shown in the drawings, forming part of the present application, is shown and described in the said copending application. In the prior application a cash register is described having mechanism suitable for recording commercial transactions by accumulating the amounts of such transactions in suitable totalizing devices. Separate printed records are made of transactions and totals may be printed of amounts accumulated by the totalizers.

The present invention relates to a cash register similarly equipped, but in addition it is provided with means whereby when amounts are added to one of the totalizers they may be subtracted from another, and also a subtotal may be printed from any totalizer.

In the specific arrangement shown in the former application the accumulated totals represent totals of transactions effected by different salesmen, whereas in the present case the totals are those of different classes of transactions, namely, "cash," "bank deposits," "checks drawn," "goods delivered," "bills paid," "miscellaneous," "received on account," "charge," and "paid out." It will thus be seen that at any period a complete printed statement of the financial condition of the business in which the machine is used may be obtained without necessarily resetting the totalizing device to zero.

Any desired number of counters are provided for counting each item entered, in its proper class. In the present machine these counters may be simultaneously reset by power applied from the main driving mechanism of the machine.

Such elements of the present machine as are disclosed in the earlier application are here briefly described, particular attention being paid only to the mechanism employed for accomplishing subtraction, and subtotalizing from any of the sets of totalizers, and for resetting by motor power all of the totalizers and accounting devices in the machine.

The machine is constructed to make separate printed records of all entries of whatever class, to total the various entries according to class, to issue a printed statement of each transaction entered, and to add to or subtract from a "cash balance" totalizer according to "received" or "paid out" amounts, to print the totals of different classes of entered amounts when desired, and to reset any of the totalizers or all counters.

It is thought that the invention may more easily be understood if the general plan of the totalizers and their operating mechanism, and their various desired operations are set out, before explaining the construction employed to accomplish the functions provided for.

Addition or subtraction is effected in any one of the totalizers by differential reciprocation of racks with which the totalizers are adapted to be connected during the initial movement of the racks. These racks are arranged in pairs above and below the totalizers with the racks of each pair in the same vertical plane. Each pair of racks is adapted to be controlled in its movement by one of the denominational banks of value keys. Thus, it is possible to add an amount to the "paid out" totalizer and subtract the same amount from the "cash balance" totalizer simultaneously, by connecting one of the totalizers with the upper set of racks and the other totalizer with the lower set of racks. Again, two totalizers may be simultaneously added to by connecting them to opposite sets of racks by predetermining, for convenience of design, that addition shall be made in one totalizer by a rotation opposite to that which effects it in the other totalizer. The arrangement of the racks accordingly permits a wide variety of different operations of the totalizers, and does not necessitate more than one set of transfer devices for each set of racks as would be the case if the totalizers were simultaneously connected to the same set of racks. Each pair of racks also has connections to a corresponding type carrier of the printing mechanism, and accordingly at each operation of any of the totalizers, the type carriers are set to print the desired amount, whether it is added or subtracted from the totalizers, the impression being made while the racks are at rest in their set positions. A totalizer is reset by backwardly rotating its pinions to zero position through connections from the main driving mechanism, and accordingly, through the racks and connections the type carriers are set properly to print a total.

If instead of resetting a totalizer it is desired merely to print the total thereon, it is permitted to remain connected to the racks during their restoring movements and thus their differential return movement retransmits the amount to the totalizer pinions.

In the normal operation of the machine when transactions are entered, the totalizer driving racks are permitted to remain in set positions at the completion of operations, and are restored to zero at the beginning of the next operation of whatever kind. As subtotalizing requires that the racks be restored to normal position a second time in order to replace the amount on the totalizer wheels, it is necessary to provide means for producing a second operation of the machine on such operations to permit the required second restoring movement. A clutch mechanism well adapted to accomplish this purpose has been devised and is described in detail further on.

To provide a compact multiple totalizer unit in the type of machine shown in the drawings, the special transaction totalizers are coaxially mounted and their various denominational elements are coördinately grouped, as described in the former application.

The invention relates to a type of machine which is varied much to suit different requirements of users and in the present case is shown adapted for any business in which it is at all times desirable quickly to ascertain its financial condition with respect to the cash on hand, and for definite periods, the totals of cash taken in, bank deposits, checks drawn, value of goods delivered, bills paid, cash received on account, charge sales, and cash paid out. One of the totalizers is assigned to accumulating amounts of other natures than those above enumerated, in order that the machine may serve the purpose of any commercial adding machine without disturbing the remaining accounts which it is adapted to keep. The individual entries are further recorded on detail record and receipt strips and are publicly indicated. Thus the work performed by the machine is to accumulate in segregated classes the various transactions entered, print records, individually and as separate totals, and, as usual, to indicate the nature and amount of each entry.

The means employed to accomplish the above functions consists primarily of a motor driven differential mechanism controlled in its movement by banks of value, clerks', and transaction keys, and having connections to select and operate totalizers and to set type wheels and indicators.

To enter a transaction the appropriate keys designating its amount and class, and the key representing the salesman having the transaction in charge, are depressed. An automatic switch controlling the motor circuit is not permitted to close the circuit until both a transaction and a salesman's key are depressed. The depression of these keys also serves to permit the operation of a clutch connecting the motor to the driving mechanism of the machine. The driving mechanism is connected first to restore the differential mechanism to normal position, and then to drive its various elements different extents as determined by the depressed keys. The differential mechanism is connected to communicate its movement to the indicators, type carriers, and driving racks for the totalizers. During the restoring movement of the differential mechanism the transaction totalizers are properly positioned so that one may be connected to the operating racks when they are at rest in their zero positions. The selection of the particular totalizer to be operated is determined by the depressed transaction key.

*Differential mechanism.*—Referring to the drawings, Fig. 2 shows one of the banks of value keys 1. These keys increase in value in order from "one" at the bottom of the bank to "nine" at the top. The depression of a key serves slightly to lift a key detent 2 pivoted on the shaft 85 and having connections to release a latch 3 from a retaining pawl 4 pivoted to the machine frame. Each latch 3 is carried by a segment gear 5 journaled on the shaft 85, one of these segments being provided for each bank of keys whether the keys represent amounts, transactions, or salesmen. A plurality of segments 6, fast to shaft 85, and having a constant oscillation at each operation of the machine, by engagement of flanges 600, formed on rearwardly extending arms on said segments 6, first restore any of the segments 5 which have been moved out of normal position by a previous operation, to their normal position, in which the segment is shown in Fig. 2. On the return movement of the member 6 shoulders 1600 formed thereon will engage any of the latches 3 which have been released by the depression of keys and, through the latches, rotate said segments 5 until the same are disconnected from the members 6 through a reverse operation of latches 3 by engagement of arms 7, carried by segments 5, with the depressed keys. The arms 7 are suitably constructed to disconnect the latches 3 from the members 6 upon said engagement, therefore, the members 6 continue their constant movement while the segments 5 are held in their adjusted positions.

The segments 5 are connected to the indicators through gear connections 8 and to the type carriers through pins 900 on the segments engaging slotted arms 9 fast on concentric sleeves 11. The sleeves are connected to rotate type carriers 12 (Fig. 1) located at the right hand end of the machine. The sleeves 11 surround a shaft 10 which has connections for setting a transaction type carrier, which is one of the type wheels 12. Shaft 10 (Fig. 3) carries rigidly an arm 155 carrying a pin 156 extending across the rear edge of an arm 911 for the bank of transaction keys, loosely mounted on shaft 10. Thus when the arm 911 moves rearwardly it engages pin 156 and, through arm 155 and shaft 10, sets the transaction type carrier. A spring 157 extended between the end of arm 155 and arm 911 normally holds the two arms in engagement but permits arm 911 and segment gear 80 fast to the transaction segment 2, to return to normal position independently of the transaction type carrier. The type wheels are retained in set positions at the completion of operations of the machine by alining pawls, but it is desirable to restore the segment 80 to normal position at the completion of operations, as explained further on. The spring permits such restoration and serves to restore the transaction type carrier when it is released from the alining pawls.

The slotted arms 9 which relate to the banks of value keys are each provided with a depending segment gear 13 meshing with a pinion 14 loosely mounted on a shaft 15, but rigid with a companion pinion 16 of larger diameter. The pinions 16 mesh with rack teeth 17 formed on yoke shaped members 18 extending below and above the totalizer pinions 19 and 20. The upper part of each yoke carries a rack 21 while the lower part carries a rack 22, and the totalizers are mounted in a frame 23 loose on shaft 15 and a frame 24 fast to that shaft. Thus, addition or subtraction as desired, may take place in the totalizers by connecting them to either the set of racks 21 or the set 22, and on such operations the totalizers are not connected during the restoring movement of the differential mechanism, but only during its forward or initial movement.

The construction of the totalizer racks is best shown in Fig. 11. Each pair of racks is mounted on the respective yoke 18 by pins 25 and 26 passing through short slots 27 in the racks. Springs 28 and 29 extending between pins 30 on the racks and pins 31 on the yokes, normally urge the racks 21 and 22 to the right as far as permitted by their slots 27, but are normally prevented from such movement by pawls 32 pivoted by pins 33 to the yokes 18. The pawls 32 normally engage shoulders 34 of the racks and if they are moved out of engagement with these shoulders, the racks will spring one step to the right (Fig. 11), the required distance to rotate the totalizer pinions one unit of movement and thereby effect transfers. Each pawl 32 is provided with a pin 35 extending through a slot 36 in its respective yoke and through a slot 371 (Fig. 10) in an arm 37 forming part of the transfer trip mechanism. Each arm 37 is rigid with a companion arm 38 having lugs 39 and 40 in suitable position to be engaged by lugs 400 (Figs. 6 to 9) on the totalizer pinion of next lower order to that engaged by the respective rack under control of arm 37. The lower pairs of arms 37 and 38 are loosely pivoted on the rod 42 (Fig. 14) and the arms of each pair are rigidly connected by sleeves 43 forming a journal on the rod 42. The upper arms 37 and 38 are fastened together by short rods 41, and these rods are journaled in the upper ends of the bosses projecting upwardly from the base frame. The pairs of arms 37 and 38 are normally urged into operative position toward the totalizer pinion by springs 44 and thus, through the slots 36, hold pawls 32 into engagement with the shoulders 34 on the racks.

Such of the pawls 32 as have been rocked out of engagement by transferring operations, are permitted again to engage shoulders 34 at the beginning of the next operation of the machine after the racks have been restored to normal position. This is accomplished by mechanism shown in Fig. 12 comprising a pair of arms 45 and 46 for each pair of racks, fast to shafts 47 and 48. Fastened to shaft 47 is a lever 49 pivoted to a pitman 50 at one end and to a link 51 at its other end. Link 51 connects lever 49 with an arm 52 fast to shaft 48. The pitman 50 is provided with a roller 53 in position to be engaged by a shoulder 54 of a cam 55 fast to a main drive shaft 56. At the required time in the operation of the machine, cam 54 engages roller 53, thus, through the pitman, causing all of the arms 45 and 46 to rock forwardly into engagement with pins 57 carried by the racks 21 and 22. By this means such of the racks as have been displaced from normal position by transferring, are restored to their normal positions and the pawls 32 retain them in such positions. The normal position of arms 45 and 46 is such as not to interfere with the movement of racks 21 and 22 when driven by the differential mechanism.

It was previously mentioned that the order of operation of the machine is, first to restore the differential mechanism, including racks 21 and 22, to normal position, then to adjust such racks as have been displaced by transferring operations into normal relation with their respective yokes 18, then, while the racks are at rest in zero positions, to connect the desired totalizers therewith, and finally differentially to move the racks extents determined by the value keys. In order to aline the racks while the totalizers are being connected thereto, a plurality of alining pawls 60 (Fig. 11) are provided, in suitable positions for engaging alining teeth 61 cut in the lower sides of yokes 18. These pawls 60 are fastened to a rod 62, journaled in the frames of the machine, and certain of the pawls are engaged at their rear ends by arms 63 fast to a rod 64, for the purpose of rocking all of the pawls into engagement with teeth 61. The rod 64 is journaled in the frames of the machine and has fast thereon an arm 65 pivoted at its upper end to a link 66 which, at its forward end, is pivoted to a bell crank lever 67 loose on shaft 48. One arm of the bell crank lever 67 is connected by a link 68 to an arm of a bell crank lever 69 pivoted on shaft 47. Bell crank lever 69 at its forward end is pivoted to a pitman 70 reciprocated by a cam 71 on drive shaft 56. The cam 71, through this mechanism, serves to operate the alining pawls 60.

*Totalizing devices.*—The "cash balance" totalizer indicated by the numeral 20 (Fig. 5) in the drawings, is operated only when amounts of cash received are recorded, or when amounts of cash are paid out. In the first case it is rotated additively, while in the second, subtractively. Thus it serves at all times to show the actual amount of cash in the drawer or on hand. It follows that it is desirable to operate this particular totalizer simultaneously with the totalizers for "cash", "received on account" and "paid out", but for the first two of these classes of transactions the "balance cash" totalizer should be added to, while at "paid out" transactions the amount paid should be subtracted from it. It is, therefore, mounted independently of the remaining totalizers, as it is at times necessary to connect it with one set of racks while the selected one of the group of totalizers shown on rod 72 is connected with the remaining set of racks.

The totalizer pinions 20 are journaled on a shaft 73 mounted in the frame 24 and are suitably spaced thereon by yokes 74 fastened to the frame and serving to retain each totalizer pinion in a vertical plane with one of the pairs of racks 21 and 22. Frame 24 is secured to rod 15 journaled in the frames of the machine and by suitable means prevented from longitudinal movement. The rod 15 also supports frame 23 in which is fastened shaft 72 supporting the totalizer pinions 19. The pinions 19 are prevented from sliding along shaft 72 by suitable spacing collars and frame 23, but frame 23 is free to be shifted along rod 15 and also to oscillate thereon. The pinions 19 constitute nine totalizers, each of which includes one pinion in each group of pinions as appears in Fig. 5, and frame 23 has fast thereon a screw 77 having threads co-acting with internal threads on a rotatable nut 78. By rotating nut 78 the frame 23 may be shifted to bring any one of the totalizers into the planes of the actuating racks 21 and 22 to be actuated thereby.

The means for rotating nut 78 is shown in Fig. 3 and consists of the segment gear 80 under the control of the bank of transaction keys 81, shown in this figure. Segment gear 80 meshes with an intermediate pinion 82 fast to a pinion 83 meshing with a pinion 84 integral with nut 78. Accordingly differential rotation of segment 80 through the pinions and nut 78 differentially positions the totalizers 19 as desired. Segment gear 80, with respect to the bank of transaction keys, is similar in principle of operation to the segment gears 5 (Fig. 2) controlled by the banks of value keys, and a description of the particular means by which keys 81 control it will, therefore, be omitted. Its time of operation is, however, different as it is desirable to accomplish the totalizer selecting while the remaining segments 5 are being restored to zero positions in order that the correct totalizer will be in position during the operating movement of segments 5. For this reason the restoring segments 6, having flanges 600 for engaging with the rear of segments 5 (Fig. 2), are fast on the oscillating shaft 85 and have connections to be oscillated by the drive shaft 56, which consist of a crank 86, on shaft 56, connected, through a link 87, to an arm 88 fast on shaft 85, while the segment 6 coöperating with the bank of transaction keys, is journaled on shaft 85 and is pivoted to the lower end of a pitman 89 (Figs. 3 and 11) operated by a cam 90 on the drive shaft 56. Cam 90 is angularly positioned on shaft 56 to effect the restoring of segment gear 80 (Fig. 3) near the end of the operation of the machine rather than at the beginning, as is the case with segment gears 5 (Fig. 2). The segment gear 80 carries a pin 800 for engagement by the flange 600 of its respective driving and restoring segment 6.

The frame 24 supporting the balance cash totalizer (Fig. 5) is provided with a pair of studs 91 passing through slots 92 (Fig. 4) in cam plates 93 secured to shaft 94 journaled in the frames of the machine. By the eccentric trend of slot 92 with respect to shaft 94, it will be seen that if the plates 93 are rocked rearwardly, the "cash balance" totalizer frame will be rocked upwardly around its supporting rod 15 thereby meshing the totalizer pinions 20 with the set of racks 21 (Fig. 2), whereas if plates 93 are rocked forwardly the totalizer pinions 20 will be meshed with the lower set of racks 22. It is by this means that addition is effected in one case when the pinions are connected to the upper set of racks, while subtraction or resetting may be effected in the other case when the pinions are connected to the lower set of racks.

The totalizers mounted on rod 72 are similarly controlled as to the mechanism for connecting them to the driving racks, the rod 72 passing through eccentric slots 95 in plates 96 fast to a shaft 97. Thus, if the plates 96 are rocked forwardly, the totalizer pinions will be lowered into connection with the lower set of racks, but when they are rocked rearwardly the pinions will be reversely moved into connection with the upper set of racks.

To retain normally all of the totalizers in disconnected position the shafts 97 and 94 (Fig. 4) on which the plates 93 and 96 are secured, are alined in normal angular positions by alining teeth 335 and 336 (Fig. 3) mounted on a link 337 pivoted at its rear end to an arm 338 on a shaft 339, and guided at its forward end by its slot 340 through which shaft 97 passes. Shaft 339 has secured thereon an arm 341 to which is pivoted a pitman 342 having a pin 343 extending into a groove on the outside of cam 100 fast to shaft 76. The cam serves to lower pitman 342 and hold it in its lowered position for a sufficient length of time to permit the totalizers to be operated. When the pitman is moved downward, through shaft 339 and arm 338 it moves link 337 to the right, thus disengaging the teeth 335 and 336 from the co-acting arms fast to shafts 94 and 97. Also rigidly fastened to shaft 339 is an alining arm 345 adapted, when the pitman is lowered, to engage teeth 346 (Fig. 5) cut in the frame 23 which supports the transaction totalizers. By this means the selected totalizer pinions are correctly alined with the racks 21 and 22.

The mechanism employed for determining whether selected totalizers are to be connected with the upper or with the lower sets of racks, is controlled by the bank of transaction keys, except at total printing operations, when it is under the control of a separate manually operated lever to be described further on. The upper set of racks serve for addition in the "cash balance" totalizer and in the "paid out" totalizer. The remaining totalizers are added to by the lower set of racks. By this arrangement simultaneous addition may take place in the "cash balance" totalizer and in either the "cash" or "received on account" totalizers. Also, as the "paid out" totalizer is added to by the upper set of racks, an amount which is added to it may simultaneously be subtracted from the "cash balance" totalizer by connecting the latter totalizer with the lower set of racks at the same operation. This plan of connecting the totalizer is carried out by mechanism under control of the bank of transaction keys (Fig. 3), and receiving power from a cam 100 secured to drive shaft 76. This shaft makes one rotation at each operation of the machine in a direction indicated by the arrow, and is provided with a cam groove 101 acting on a roller 102 carried by the downwardly extending arm of a bell crank lever 103, journaled on a stud 104 fixed in one of the supporting frames of the machine. Groove 101 is suitably formed to oscillate bell crank lever 103 once during an operation of the machine and serves at the required time to cause a V shaped plate 105 pivoted at 106 to the forwardly extending arm of the bell crank lever, to move downwardly. The two arms 107 and 108 of the plate 105 are respectively provided with notches 109 and 110 for engaging pins 111 and 112 on a beam 113 fast to a sleeve 114 surrounding a fixed rod 75. Normally slot 109 engages pin 111, thus on the downward movement of plate 105 sleeve 114 will be rotated slightly in a clockwise direction and thus, through a beam 115 (Fig. 4) fast on sleeve 114, a pitman 116 will be lowered while a pitman 117 will be lifted, as these pitmen are respectively provided with notches 118 and 119 normally engaging pins 120 and 121 on the ends of lever 115. Such a normal operation would occur on the depression of either the "cash" or "received on account" keys, which have no connections to alter the operation. This downward movement of pitman 116 (Fig. 4) causes the totalizer pinions 19 to be lowered, thus meshing either the "cash" or "received on account" totalizers with the lower set of racks. The upward movement of pitman 117, by rocking plate 93 counter-clockwise, lifts the "cash balance" totalizer pinions into mesh with the upper set of racks. Then, upon the differential movement of yokes 18 (Fig. 2) under control of the value keys, racks 21 will add the amount represented by the depressed value keys to the "cash balance" totalizer and to the selected one of the group of transaction totalizers.

It was previously mentioned that addition takes place in the "paid out" totalizer by the upper set of racks, consequently when the "paid out" key is depressed it is necessary to reverse the operation of pitmen 116 and 117, that the "paid out" totalizer may be added to while the "cash balance" totalizer is subtracted from. In order to accomplish this the "paid out" key has connections to the V shaped plate 105 (Fig. 3) so that it may be rocked on its pivot 106 so that notch 110 engages pin 112 of lever 113. Then, on a downward movement of plate 105, sleeve 114 will be rocked counter-clockwise, thus serving, through the lever 115 (Fig. 4), to lift pitman 116 while lowering pitman 117. Then plates 96 and 93 will be rocked oppositely to the direction in which they are rocked when "cash" or "received on account" entries are made, and the "cash balance" totalizer is connected to the lower set of racks while the "paid out" totalizer is connected to the upper set of racks.

The particular connection between the "paid out" key and plate 105 for effecting the above explained rocking movement of plate 105, is shown in Fig. 3 and comprises a segment 125 loosely pivoted on shaft 85 and provided with an extension 126 having an edge inclined relative to the path of movement of a pin 127 on the shank of the "paid out" key 128. Segment 125 is connected by a link 129 to lever 130 loosely journaled on rod 75 and provided with a slot 131 through which extends a pin 132 on the plate 105. By this connection depression of the "paid out" key lifts arm 125 and, through the link 129, rocks lever 130 clockwise, and this rocks plate 105 counter-clockwise around pivot 106, disengaging it from pin 111 and engaging its notch 110 with pin 112.

When any of the remaining transaction totalizers are added to, the connecting mechanism, as far as the group of multiple totalizers is concerned, is permitted to operate in its normal manner, thus connecting the selected one of the totalizers with the lower set of racks, so that it will be added to, but when a key is depressed corresponding to one of these remaining totalizers, namely, "bank deposits," "checks drawn," "goods delivered," "bills paid," "miscellaneous," and "charge," the connecting mechanism for the "cash balance" totalizer is made inoperative so that this totalizer will not be affected by movement of the differential racks. This function is accomplished by rocking pitman 117 forwardly a slight distance around its pivotal connection to plate 93, so that its notch 119 becomes disengaged from the pin 121 on lever 115, and then when lever 115 is rocked it has no effect on pitman 117. A spring 133 (Fig. 4) normally retains the pitman 117 in engagement with pin 121, and to rock it out of engagement with this pin an arm 134 fast to a shaft 135 is rocked into engagement with a pin 165 on the pitman. This arm 134 receives its motion from the transaction keys just named through a segmental plate 136 (Fig. 3) having inclined extensions 137 in the path of pins 138 on said keys. The depression of one of the keys therefore serves to lift plate 137, and through a link 139 pivoted thereto and to an arm 140 fast on shaft 135, rocks the shaft in a clockwise direction, and therefore causes arm 134 to engage pin 136, and rock pitman 117 to an inoperative position.

The totalizing mechanism above described is substantially the same in construction as that shown and described in the before mentioned copending application of H. A. Martin. In the present case the multiple totalizers are described as intended for receiving amounts according to the different classes of transactions, whereas in the previous case the multiple totalizers were described as intended for receiving amounts classified in different totalizers according to the clerks having the transactions in charge. This change involved a rearrangement of the totalizer meshing mechanism in order that desired ones of the totalizers could be added to or subtracted from as required.

The transfer mechanism, controlled in its operation by the multiple totalizers, is also substantially the same as that shown and described in the aforesaid Martin application, it being altered only as required by the new use to which the multiple totalizers are put. As certain of the totalizers are both added to and subtracted from on the different operations, it is necessary that they be constructed to control the transfer mechanism whether in mesh with the upper or lower sets of actuating racks. For this purpose the totalizer pinions are provided with two sets of tripping lugs at suitable angular locations on the pinions to trip the transfer elements at the required times. The two lugs (Fig. 12) on any one pinion are not in the same plane so consequently the lug which operates during addition would not trip the transfer mechanism on a subtracting operation and vice versa. To correspond with the arrangement of lugs on the pinions, the transfer trip devices which coöperate therewith are also in different planes, the trip devices of the lower set of racks being slightly offset from the trip devices of the upper set of racks in vertical planes passing from front to rear of the machine.

*Printing totals.*—In total printing or resetting operations only one totalizer may be operated at a time, as the connections to the type carriers must be under the control of but one totalizer. To set the type carriers to print a total, the differential yokes 18 are driven by backward rotation of the totalizer pinions and communicate their differential movement through segments 13 (Fig. 2) and sleeves 11 to the type carriers. As the totalizer pinions are reversely rotated and it is desired differentially to move the yokes 18 in the same direction as they are normally operated to actuate the totalizers, it is necessary to connect a selected totalizer with the particular set of racks 21 or 22 which would normally cause subtraction therefrom. Accordingly means, independent of the transaction keys, for rocking the pitmen 116 and 117 (Fig. 4) around their pivots, is provided. This means comprises a manually operated segment gear 141 meshing with a pinion 142 loosely journaled on a shaft 76, mounted in axial alinement with drive shaft 56, but rigidly connected by a sleeve 143 (Fig. 17) to a pair of cams 144 and 145. Cam 144 is provided with a groove 146 indicated by the heavy broken lines in Fig. 4, into which extends a pin 147 on pitman 116, and cam 145 is provided with a groove 148, shown by light broken lines in the drawings, and into which extends a pin 149 on pitman 117. Thus, by differentially rotating these cams through the lever 141, the direction of operation of either pitman may be reversed, while the other one is made entirely inoperative. The manually operated segment or lever 141 is loosely pivoted on shaft 85 and is provided with a spring pressed thumb grip or latch 150 adapted to enter notches 151 in a fixed plate 152, thus serving either to hold the segment 141 in its normal position or in any one of its set positions. When latch 150 engages the lowest notch 151, cams 144 and 145 are held in normal inoperative positions, their grooves being suitably formed to permit the vertical reciprocation of pitmen 116 and 117, as required for the entry of items. When the segment 141 is rocked upwardly and its latch 150 engages the second or third notches, the cams are suitably positioned for printing the total accumulated by the "cash balance" totalizer. If the latch engages the third notch the total will be printed without permanently resetting the totalizer, whereas if it engages the second notch the total will be printed and the totalizer reset. Of course, the totalizer must be reset in both cases in order to print the total, but in one case it is again forwardly rotated to its former setting, while in the other case it is permitted to remain in its zero position. When latch 150 engages the fourth or fifth notch 151 the lever 141 is in position to cause printing of totals from the other totalizers.

To print a total and reset, the desired totalizer is connected to the particular set of racks which would be employed to subtract from it. A spline in the totalizer supporting shaft is shifted relatively to the shaft, and thereby cams pawls seated in the shaft into position to engage lugs on the totalizer pinions upon rotation of the shaft. The shaft is rotated by connections to the driving mechanism and its pawls engage the lugs of the totalizer pinions at the different positions at which they may be set, thus rotating each pinion backwardly to zero position and thereby, through the differential yokes 18, setting the type carriers a number of units equaling that which had been added into the totalizer. The impression is taken at the same point of the operation of the machine as when amounts are entered. Thus totalizing and resetting are similar to a subtractive operation, with the exception that the differential mechanism is controlled by the totalizer elements instead of by the keys, the transfer mechanism is disabled and the splines of the totalizer shafts are shifted to operative position, as above mentioned.

To print a subtotal the operation is still further different from normal operations in that the differential mechanism is again restored to zero position with the totalizer still connected thereto, for the purpose of retransmitting the total to the totalizer. A second rotation of the drive shaft 56 is employed to effect this additional purpose.

The specific mechanism shown for accomplishing totalizing operations will now be pointed out. Resetting lever or segment 141 (Fig. 15) is provided with a slot 153 acting as a cam for a portion of its length, so that the first unit of its movement will serve to rock an arm 154 downwardly around its supporting pivot 155 as arm 154 has a roller 156 riding in slot 153. Arm 154 is rigid with an arm 157 having a pin 158 passing through a slot 159 in a pitman 160. Pitman 160 has a slot 161 through which shaft 76 passes, and by its pin connection with arm 157, the pitman is rocked to engage its notch 162 with a pin 163 on a segment gear 164 loosely journaled on shaft 85. Thus this first unitary movement of lever 141 serves to connect pitman 160 with segment 164 which meshes with a resetting rack 165. A cam (not shown) for operating pitman 160, is fast to shaft 56 and is timed to reciprocate the pitman so that rack 165 will move rearwardly at the same time that the differential mechanism operates the totalizers when items are entered.

Rack 165 has riveted to it a rack 166 for resetting any of the totalizers except the "cash balance" and "paid out." The latter are reset by a rack 167 also riveted to rack 165.

The "cash balance" totalizer shaft 73 (Fig. 5) has pinned to it a pinion 168 to connect it to rack 167 and the transaction totalizer shaft has feathered to it a broad pinion 169 to connect it to either of racks 166 or 167.

Each totalizer shaft is provided with a spline 170 (Figs. 6 to 9) having notches 171 which are normally in the planes of the totalizer actuating racks 21 and 22. Opposite the notches the totalizer shaft is provided with plungers 172 fitting in recesses in the shaft and adapted to be cammed outwardly into the planes of projections 173 on the inner side of the totalizer pinions. By shifting the splines 170 in the direction of their length, plungers 172 are cammed outwardly against the action of springs 174 which normally retain them in inoperative position.

The splines are shifted by mechanism under the control of resetting lever 141 and shown in Figs. 12 and 13. The resetting lever 141 has a shoulder 175 which, when the lever is shifted for resetting and total printing, engages a pawl 176 fast to a shaft 177 to which is also secured an arm 178 having a pin 179 passing through a slot 180 in a pitman 181, pivoted at its upper end to an arm 182 fast to shaft 75. Another arm 183 pinned to shaft 75 carries a roller 184 extending into a cam groove 185 in a disk 186 fast to shaft 76. Thus shaft 76, which makes one rotation on all operations of the machine, serves to reciprocate pitman 181, and when lever 141 rocks pawl 176 rearwardly, a notch 187 in the pitman engages a pin 188 on a lever 189 loosely pivoted on shaft 177. Lever 189 is thereby oscillated and through a link 190 rocks arms 191 and 192 secured together at their hubs on a stud 193 in a fixed bearing 194. Arm 192 has an eccentric slot 195 through which extends a stud 196 fast to a shaft 197 mounted for longitudinal movement in the side frames of the machine. This shaft carries fast thereon a pair of arms 198 in position to engage the ends of the spline in shaft 72 and another arm 199, forked at its end to engage a grooved collar secured to the spline in shaft 73. Thus, when slotted arm 192 (Fig. 13) is rocked through its connections to cam 186, its eccentric slot 195 engages stud 196 and thereby shifts shaft 197 which, through the arms carried thereby, shifts the totalizer splines. The plungers 172 (Figs. 6 to 9)

are in this manner made effective to reset any selected totalizer upon the operation of its respective shaft. On such operations the totalizer shaft is caused to make one complete rotation as driven by rack 165 (Fig. 15), the plungers 172 engaging lugs 173 of the totalizer pinions at some time during the rotation of the totalizer shaft, carrying the pinions backward to zero positions. As the selected totalizer is at this time connected to one or the other of the sets of racks 21 or 22 its reverse movement is communicated through the yokes 18 (Fig. 2), rack 17, pinions 14 and 16, segment 13 and sleeves 17 to the type carriers. The impression is then taken printing the total on both the check and detail strips. The specific arrangement of the printing mechanism is described in the before mentioned patent application of E. J. Von Pein.

Overthrow of yokes 18 is prevented by their alining pawls 60 (Figs. 2 and 15) which are engaged with teeth 61 of the yokes at the end of the stroke of rack 165. For this purpose rack 165 has a camming shoulder 600 for engaging an arm 601 fast to rod 62 to which the pawls are also fast.

On total printing operations the selection of the desired totalizer is determined by the depression of a transaction key, which results in the required axial movement of the totalizer shaft 72, as is the case when an item is entered. There is no individual transaction key for the "cash balance" totalizer as it is always operated when "cash," "received on account" and "paid out" entries are made. Thus to print a total from the "cash balance" totalizer, the depression of the cash key will serve to make it operative and by adjusting lever 144 to the second or third notches in plate 152, pitman 117 will be positioned for an operation of subtraction, while pitman 116 is made inoperative.

Fig. 14 shows means for compelling the depression of the "cash" transaction key in order to cause the printing of a total from the "cash balance" totalizer. When lever 141 is adjusted to the "cash balance" totalizer resetting position a nose 300 thereon engages a pawl 301 loose on shaft 177 but rigid with an arm 302 which, at its outer end, is forked over a pin 303 on a plate 304 slidably mounted in the frame for the bank of transaction keys. This plate has a series of notches 305 opposite pins 138 on the transaction keys and thus normally permits their depression, but when lever 141 is adjusted one or two steps upwardly, plate 304 is lifted by pawl 301 and arm 302, thus causing slots 305 to pass away from pins 138, and then the plate serves to prevent depression of any of the transaction keys except "cash," which is the uppermost key, to the side of which the plate does not extend.

By this mechanism a needless longitudinal shifting of the totalizer frame 23 is prevented.

In order that, during total printing operations, that part of the differential mechanism of the machine consisting of segment gears 5 (Fig. 2) may remain in its zero position when restored by the segments 6, the slots in arms 9 are open at their upper ends so that they may freely move away from pins 900 on segment 5 when the segment gears 13 to which they are attached are differentially positioned by the totalizer elements. Also to prevent release of segments 5 through operation of latches 3 by the depression of value keys, the resetting lever 141 has connections for disabling the usual retaining bars 200, the latter having shoulders 201 extending across the rear of pins 202 on latches 3, and serving normally to prevent rearward movement of the latches into engagement with the shoulders on driving segments 6. As described in the previously mentioned patents, when a value key is depressed at a regular operation, a key detent segment 2 is lifted against spring action out of engagement with a shoulder 203 (Fig. 11) on the corresponding retaining bar 200. The bar is then free to move rearwardly under the action of its spring 204, thus permitting latch 3 also to move rearwardly under spring action into engagement with the shoulder on segment 6. But when the resetting lever 141 is shifted away from normal position its shoulder 175, as previously described, by operating pawl 176, serves to rock shaft 177 in a clockwise direction (Fig. 12). Shaft 177 (Fig. 11) carries rigidly arms 205 having shoulders 206 which, when the shaft is rocked, move to the rear of pins 207 on the retaining bars 200 and thereby prevents their rearward movement. There is, of course, an arm 205 for the retaining bar 200 of each bank. One of these arms is also provided with a shoulder 208 which moves to the rear of a pin 209 on an arm 210 fast to the usual key release shaft 211, thus making the latter shaft ineffective.

As an arm 318 and the pawl 176 (Figs. 12 and 14) are both fast to shaft 177, when the pawl 176 is rocked rearwardly a pitman 321 will be slightly rocked rearwardly around shaft 56 thus engaging its notch 324 with a pin 325 on an arm 311 fast to a sleeve 308. Then when the pitman is lifted by a cam 323 on shaft 56, arm 311 will be rocked upwardly and as it is connected by a sleeve to an arm 306, the latter arm will be rocked in a counter-clockwise direction causing its shoulder 327 to engage a pin 328 on an arm 307 fast to a shaft 316, thus rocking shaft 316 and, through arms 317 fast thereon, rocking the upper set of transfer pawls 38 upwardly. At the same time gear teeth 309 on arm 306 engage teeth on an arm 310 forcing said arm downwardly and, through a link 312 connecting arm 310 with an arm 313 fast to shaft 314, rocks shaft 314 in a counter-clockwise direction, accordingly arms 315 engage the rear extensions of the lower set of pawls 38 and rocks these pawls to inoperative position.

In order that on total printing operations sleeves 11 (Fig. 2) may not by friction rotate each other, means are provided for preventing movement of yokes 18 which are not driven by rotation of the pinions with which they mesh. This means consists of a series of spring actuated retaining pawls 330 which have V shaped noses 331 for engaging pins 332 on the yokes 18, consequently the yokes may be positively moved in spite of the obstruction of the pawls, but the pawls serve to prevent their accidental movement, such as possibly could occur through friction between sleeves 11.

At total printing operations the selected totalizer is connected to and disconnected from the racks at the usual time, but if it is desired to print a subtotal, that is, to reset a totalizer in order to set the type carriers to print the total, but then to replace the amount on the totalizer, it is necessary to retain the totalizer connected to the racks for a longer period, in order that the differential mechanism, consisting of racks 21 and 22 and their connections to the type carriers, may be returned to zero, and thus replace the amount on the totalizer. To accomplish this end, lever 141 has connections whereby when it is set to either the second or fourth notches in plate 152 (Fig. 15), it causes shaft 76 to remain inoperative for a certain length of time while the main drive shaft 56 of the machine makes an additional rotation. Shaft 76 furnishes power for connecting and disconnecting the racks and the totalizers and shaft 56 furnishes power for restoring the differential mechanism. These shafts are mounted in alinement as shown in Fig. 17 and are normally caused to rotate together by a pawl 215 pivoted on a gear 216 fast to shaft 56 and engaging a notch 217 in a disk 218 fast to shaft 76. The motor (not shown) has gear connections to main drive shaft 56 as indicated by bevel gears 560 and 561 in Fig. 21, and this shaft through pawl 215 drives shaft 76.

Shaft 76 has connections for opening the motor circuit and stopping the motor, which connections are operative near the end of the rotation of said shaft. Consequently, if pawl 215 is disconnected just previous to the completion of rotation of shaft 76, the motor will continue to drive shaft 56 until the pawl is again connected to disk 218 to cause shaft 76 to complete its rotation. For the purpose of disconnecting pawl 215 at the required time, cam 145 (Fig. 15) fast to sleeve 143 is provided with a groove 219 so shaped that when lever 141 is positioned to either the second or fourth notches, its subtotalizing positions, sleeve 143 is rotated accordingly by its gear connection to lever 141 and the cam by engagement with a roller 220 on a frame 221 rocks the frame in a clockwise direction thereby carrying a pinion 222 into mesh with gear 216. The pinion 222 is of such relative proportion to gear 216 (shown in the figure as two to five) that a roller 223 pivoted on the pinion engages the inclined edge 224 of pawl 215, when shaft 76 has made two-thirds of a rotation. The engagement of roller 223 with the pawl disengages pawl 215 from disk 218, consequently shaft 56 may make a second rotation independently of shaft 76. When the pawl again reaches notch 217 it engages the same through the action of its spring 225, as on every second rotation of the pinion the roller 223 fails to engage the pawl 215 with the proportions shown.

Shaft 56 restores racks 21 and 22 by means of a pitman 226 (Fig. 2) acted upon by a cam 227 fast to the shaft. At its lower end the pitman is pivoted to an arm 228 fast to a restoring yoke consisting of arms 229, pivoted on shaft 10 and rigidly secured together by a rod 230. When the pitman 226 is lifted by cam 227, it causes rod 230 to engage the rear edges of all of the arms 9, restoring them to normal positions and consequently, through the yokes 18 which are geared to said arms, the racks 21 and 22 are restored and thereby retransmit their differential movement to the totalizer pinions. The pitman 226 is reciprocated once during the first part of each rotation of the shaft 56, consequently at normal operations of the machine this restoring mechanism assists the restoring segments 6, as the slots in arms 9 are open ended and therefore pins 900 on segments 5 cannot restore the arms all the way to zero positions. At resetting operations, as segments 5 are entirely inoperative, the mechanism just described accomplishes the work of restoring the differential mechanism alone.

As, at subtotaling operations, drive shaft 56 makes two rotations, the first reciprocation of pitman 226 serves to assist in restoring the differential mechanism as on ordinary operations of the machine as is required before a totalizing operation may be performed, while the second reciprocation replaces the total on the totalizer.

The manner in which shaft 76 controls the motor clutch and switch is shown in Fig. 20. This mechanism is not shown in detail but, as described in the previous Martin application for patent, is operated by a spring 231 which normally urges an arm 232 to rock in a clockwise direction. Arm 232 is forked at its outer end over an arm 233 pivoted on a stud 234 in the machine frame and controlling a spring actuated disk 235 which in turn controls the motor clutch and switch closing device. An operation of arm 232 is normally prevented by detents 236 and 237 on the key detents 2 for the banks of clerks initial and transaction keys. When keys in these banks are depressed arms 238 and 239 fast to a sleeve 240 are permitted to rock in an anti-clockwise direction as urged by spring 231, connected to sleeve 240 by an arm 241 fast to shaft 242, to which arm 232 is also secured, and a link 243 pivoted at its rear end to arm 241 and at its forward end to an extension of arm 239. Thus, when the required combination of keys is depressed, spring 231 is released, thus closing the motor circuit and operating a clutch 244 which serves mechanically to connect the motor with drive shaft 56. The details of both these mechanisms are described in an application for patent on cash registers filed by W. A. Chryst September 23, 1907, No. 394,187. The present invention has to do more specifically with the means for disabling shaft 76 for a certain period, as this shaft carries a cam 71 having a pin 245 for engaging a lug 246 of link 243 to return the link to its normal position and thereby restore the mechanism shown in Fig. 20 and thus release the motor clutch and open the motor circuit.

The sleeve 240 which is fast on a shaft 280 carries a pawl 1410 (Figs. 4 and 20) which, when the sleeve is rocked upon the release of the machine, enters one of notches 1411 in a plate fast to the lever 141 and thus prevents manipulation of the lever during operation of the machine.

As in the before mentioned Martin application for patent, a plurality of counters are mounted on a shaft 247 (Figs. 18 and 19). One counter is provided for each class of items entered in the machine and an additional counter for counting all items which are entered in the machine. The means for selecting and operating these counters are described in the previous application, and need not be repeated here. In the present case the means for resetting the counters is an improved mechanism, its object being to reset all of the counters simultaneously by connecting the supporting shaft 247 to the driving mechanism of the machine. The shaft 247 is provided with a longitudinal groove which, when the shaft is rotated in one direction, engages pawls carried by the counter pinions and thereby rotates the pinions to zero position, as is well known in the art. For this purpose shaft 247 carries rigidly a pinion 248 meshing with a pinion 249 on a short shaft 250 journaled in the machine frame and carrying a pair of pinions 251 and 252. The pinion 251 is fast to shaft 250 while the pinion 252 is loosely journaled thereon. Pinion 252 is geared to drive shaft 56 through pinion gears 253, 254, 255, 256 and 257, the latter being fast to shaft 56 (Fig. 1). A broad pinion 258 carried by an arm 259 pivoted on a stud 260, is adapted to connect pinions 251 and 252 when arm 259 is rocked downwardly. In order so to rock the arm a hand operated slide 261 is provided with a cam slot 262 through which extends a pin 263 on arm 259. Slide 261 is supported by a slotted bracket plate 264 and stud 260 which passes through a slot 265 in the slide. Thus by moving slide 261 rearwardly against the tension of a restoring spring 274, the broad pinion 258 is meshed with the pinions 251 and 252 and consequently upon the rotation of shaft 56 the counter supporting shaft 247 will be caused to rotate and reset the counters. In order to prevent accidental rotation of shaft 250 the slide 261 is provided with an extending arm 266, normally engaging the disk 267 fast to shaft 250 at a notch 268 in said disk. When slide 261 is depressed arm 266 is, of course, disengaged from the disk, and also a spring actuated pawl 269 is forced out of a notch 270 in plate 211, and is permitted to reëngage the plate at a notch 271 and thereby hold it in its depressed position. Toward the end of rotation of disk 267 a pin 272 carried thereby engages a shoulder 273 of pawl 269, rocking the pawl out of engagement with notch 271 in the plate and permitting the plate to resume its normal position and disengage the broad pinion 258, by the action of its restoring spring 274. Pawl 269 is also provided with an extending part 277 having a notch 278. The notch 278, by co-acting with an arm 279 (Fig. 1) on the shaft 280 (Fig. 20), serves to prevent depression of plate 261 during an operation of the machine, as, rigid on shaft 280, is an arm 281 (Fig. 20) co-acting with a pin 282 on one of the detents 2. Thus, when the machine is released for operation by the depression of keys, shaft 280 is permitted to rotate slightly under spring action, thus carrying the flange on arm 279 either into notch 278, or if plate 261 is depressed, in front of the extension 277. By this means manipulation of plate 261 during an operation of the machine is prevented and thereby a partial rotation of the counter resetting shaft is prevented.

*Operation.*—Transactions are entered in any of the totalizers and their amounts printed by depressing the appropriate keys which results in connecting the motor to drive shaft 56, the latter then making a single rotation. Its first operation, through the pitman 87 (Fig. 2), is to oscillate segments 6 in a counter clockwise direction, thus causing the rear ends 600 of the segments to engage the rear edges of segment gears 5, rotating the same in a counter clockwise direction to zero positions, thus these segments and devices geared thereto are restored to normal position. Segments 5 are connected directly to the indicators through gears 8, thus the indicators rotate with the segments. The segments being connected through arms 9 to type carriers 12 and to the differential racks 21 and 22, the type carriers and racks will also be restored to normal position. The restoring movement is made complete by the oscillating frame 229, the rod 230 of which engages the rear arms 9 upon the upward movement of pitman 226. After the racks, type carriers and indicators are restored, pawls 45 and 46 (Fig. 12) are rocked into engagement with the pins 57 on the racks 21 and 22 which had been permitted to make a unit of movement relatively of their carrying yokes 18 on the previous operation. This relative movement occurs in transferring, and rocking of the pawls 45 and 47 permits the spring actuated transfer pawls 32 to reëngage shoulders 34 of the racks. The pawls 45 and 46 are operated by link and lever connections to a pitman 50 coöperating with a cam on drive shaft 56.

While the differential mechanism is being restored to its normal position, segment gear 80 (Fig. 3) under the control of the transaction keys 81 rotates rearwardly and thereby, through the pinions 82 and 83, rotates the nut 78 (Fig. 5) and thus positions the transaction totalizer carrying frame 23 so that the desired transaction totalizer is placed in operative relation with racks 21 and 22. Power is furnished to segment 80 by a cam 90 (Fig. 11) on shaft 56, through pitman 89 co-acting therewith and a segment 6 (Fig. 3) which is pivoted to the lower end of the pitman. The segment 6 by engaging a latch on the segment gear 80 moves it in a counter clockwise direction until the latch is disengaged from segment 6 by engagement with a depressed key.

When the differential mechanism is at rest and the desired totalizer is in operative position, such totalizer is connected with one or the other of the sets of racks 21 and 22, according to which of these racks are assigned for addition on the particular totalizer. Which totalizer shall be so connected is determined by the bank of transaction keys which also have connections, as shown in Figs. 3 and 4, for determining the direction of movement of pitmen 116 and 117 controlling the slotted plates 93 and 96, for moving the totalizers either upward or downward. If the item is one relating to "cash received" or "cash received on account" or "paid out", the "cash balance" totalizer 20 will be operated as well as the selected transaction totalizer. If the item is one of "cash received", the "cash balance" totalizer is connected to the upper set of racks 21, and the selected transaction totalizer to the lower set of racks 22, and then when the racks are moved differentially addition will occur on both selected totalizers. If a "paid out" item is being entered, the "cash balance" totalizer is connected to the lower set of racks 22 and is consequently subtracted from, while the "paid out" totalizer is added to by the upper set of racks, addition in it being caused by opposite rotation from that to cause addition in the remaining transaction totalizers. If any one of the remaining totalizers is to be added to, the "cash balance" totalizer is made entirely inoperative by causing its pitman 117 to be rocked to an inoperative position. The connections for rocking the pitman are the link 139 (Fig. 3), arm 140, shaft 135 and an arm 134 (Fig. 4).

After the selected totalizer is connected to the racks, segments 6 (Fig. 2) are moved in a clockwise direction thus engaging latches 3 of banks in which keys have been depressed and carrying their respective segment gears 5 rearwardly until the latches engage the shanks of depressed keys, when the segments 5 are latched in their differentially moved positions and segments 6 permitted to complete their rearward movement. The differential movement of segments 5 serves to set the indicators by their direct gear connection, and the type carriers through arms 9 and sleeves 11, and also differentially moves yokes 18 thereby causing the differential movement to be communicated to selected totalizers through the racks 21 and 22. At the completion of the rearward movement of segments 5, the type carriers 18 are alined in their set positions and the impression is taken.

After the impression is made, which occurs near the end of the operation of the machine, a pin 245 on cam 71 (Fig. 20) engages shoulder 246 of link 243 thus causing arm 233 to be rocked into position to disengage the motor clutch, and to cause the motor circuit to be opened.

To print the total from any totalizer the value keys are permitted to remain in undepressed position, a transaction key is depressed in order that the desired totalizer may be selected, and to assist in unlocking the machine, for which purpose a clerk's initial key also must be depressed. The resetting lever 141 is adjusted away from normal position in order to make the resetting mechanism operative. The operation is much the same as for entering an item, that is, all of the differential mechanism of the machine is first restored to normal position, during which time the desired totalizer is selected. Then it is connected as for an operation of subtraction, and its supporting shaft is rotated causing the plungers mounted therein to engage teeth on the totalizer pinions and rearwardly rotate these pinions to zero positions. As the totalizer is at this time connected to either the set of racks 21 or the set 22, the yokes 18 are differentially moved away from their positions, thus, through the rack teeth 17 thereon, rotating the pinions 16. These pinions, through pinions 14, rotate segments 13. As the segments 13 are fast to sleeves 11 on which the type carriers are mounted the type carriers will be set for printing the total. An impression is then taken, and the motor clutch disengaged and the circuit opened.

To print a subtotal, the lever 141 is adjusted to either the second or fourth position depending upon whether it is desired to print a subtotal from the "cash balance" totalizer or one of the transaction totalizers. All other manipulation required, as in a total printing operation, is to depress the appropriate transaction key and one of the clerk's initial keys, thus releasing the machine and closing the motor circuit. The adjustment of lever 141 to its second or fourth position causes cam 219 (Fig. 15) to become effective in rocking frame 221 around shaft 75, thus placing pinion 222 (Fig. 16) in mesh with gear 216. Accordingly, when shafts 56 and 76 have made two-thirds of a rotation, roller 223 engages the tail of pawl 215 disconnecting these two shafts. Shaft 76 then remains idle while shaft 56 makes a second rotation, thus operating the restoring mechanism shown in Fig. 2 a second time. In subtotalizing operations the machine operates in the usual manner up to the point of taking an impression of the total, but as shaft 76 remains idle during the second rotation of shaft 56 the selected totalizer remains connected to the differential racks for an additional period, as shaft 76 controls the operation of pitmen 116 and 117 (Fig. 4). Also, shaft 76 controls the opening of the motor circuit and the disconnection of the motor clutch. These devices remain in operative position during the second rotation of shaft 56. When pawl 215 (Fig. 16) again engages disk 217, shaft 76 completes its single rotation thus opening the motor circuit and disconnecting the clutch. From this it will be seen that certain parts of the machine on subtotalizing operations go through their normal operation twice. This is due to their being connected for operation to shaft 56. Such of the mechanism as need only operate once on a subtotalizing operation is connected to be operated by shaft 76.

On subtotalizing operations, a row of ciphers will be printed below the subtotal at the second rotation of shaft 56 and in this manner serve to distinguish subtotals from totals. The platen is connected to be operated near the completion of each rotation of shaft 56, consequently on the first rotation of the shaft it takes an impression of the subtotal and on the second an impression of the row of ciphers, as at that time the type carriers are again in normal positions.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with a totalizer, and two connected racks on opposite sides of said totalizer constructed to operate it in opposite directions, devices for connecting said totalizer to one of said racks, a key having connections to shift an element of said devices whereby the totalizer may be connected to the other rack, a total lever, and means controlled thereby for shifting another element of said connecting devices whereby said totalizer may be connected to said other rack.

2. In a machine of the class described, the combination with a totalizer, and two connected racks on opposite sides of said totalizer constructed to operate it in opposite directions, means for moving said racks differentially, devices for moving said totalizer into connection with either rack and normally adjusted to cause connection of the totalizer with one of the racks, a key having connections to adjust an element of said moving means to cause the totalizer to be connected to the other of said racks, and a lever constructed to adjust another element of said moving means so as also to cause connection of said totalizer with said other rack.

3. In a machine of the class described, the combination with a totalizer and adding and subtracting racks therefor, of means for moving said totalizer into connection with either of said racks, normally set to move the totalizer into connection with said adding racks, a key having connections to adjust an element of said moving means to cause said totalizer to engage said subtracting racks, a total lever, and connections to shift another element of said moving means whereby also to cause movement of said totalizer into connection with said subtracting rack.

4. In a machine of the class described, the combination with a totalizer, and adding and subtracting racks therefor, of a pitman constructed to move said totalizer into connection with either rack, a bifurcated element having one bifurcation normally connected to drive said pitman, a key having connections to shift said bifurcated element to cause the other bifurcation to drive said pitman, a centrally pivoted lever to one end of which said pitman is normally connected, a total lever, and means controlled by said lever for shifting said pitman to connect it to the other end of said lever.

5. In a machine of the class described, the combination with a totalizer and adding and subtracting racks therefor, of a pitman constructed to move said totalizer into connection with either of said racks, a centrally pivoted lever operating said pitman, a bifurcated element having one of its bifurcations normally connected to said pitman, a key having connections to shift said element whereby to engage its other bifurcation with said pitman, and means for giving said element movements of invariable extent.

6. In a machine of the class described, the combination with a totalizer, and racks on opposite sides of said totalizer constructed to operate said totalizer in opposite directions, of a pitman constructed to move said totalizer into connection with either of said racks, a centrally pivoted lever to one arm of which said pitman is normally connected, with means for rocking said lever, a key having connections to disconnect said pitman from said lever, and a manually operated element having connections to connect said pitman to the other arm of said lever.

7. In a machine of the class described, the combination with a plurality of totalizers and two frames carrying said totalizers, of adding and subtracting racks for said totalizers, two pitmen connected one to each of said carrying frames, means, normally connected to said pitmen, constructed to operate them and thereby said frames oppositely, and a key having connections to reverse the connections of said means to said pitmen, and thereby reverse the direction of movement of said carrying frames.

8. In a machine of the class described, the combination with a totalizer and operating racks therefor on opposite sides thereof, of a pitman constructed to engage said totalizer with either of said racks, means for driving said pitman normally connected to move it in a direction to cause engagement of said totalizer with one of said racks, a key having connections to disengage said pitman from its said driving means, and a manually operated element constructed to reverse the connection of said driving means to said pitman whereby the totalizer may be moved into engagement with the other of said racks.

9. In a machine of the class described, the combination with a totalizer and an operating rack therefor, of a pitman constructed to move said totalizer into engagement with said rack, a device having an invariable extent of movement and connected to drive said pitman, and a key having connections to disconnect said pitman from said driving device.

10. In a machine of the class described, the combination with two totalizers and operating means therefor, of a bank of transaction keys controlling the operation of said totalizers by said operating means, a lever adjustable to different controlling positions, connections controlled by said lever to cause resetting to zero of said totalizers, and means actuated by movement of said lever to one of its resetting positions for locking all the keys except one in said bank of transaction keys.

11. In a machine of the class described, means for distinguishing printed subtotals from grand totals comprising devices automatically and as an incident to the subtotaling operation causing printing of a row of ciphers after the printing of the figures of a subtotal.

12. In a machine of the class described, the combination with a totalizer, means for printing grand totals and subtotals therefrom, a lever controlling said printing of totals, and devices, actuated by said lever, when the same is moved to its subtotal printing position, for automatically and as an incident to the sub-totaling operation causing printing of a row of ciphers after the printing of the figures of the subtotal.

13. In a machine of the class described, the combination with a totalizer, of means for printing grand totals and subtotals therefrom, a motor driving said totalizer and causing said printing of totals, a lever controlling the said printing of totals, and devices, actuated by said lever when the same is moved to its subtotal printing position, for causing an abnormal operation of said motor and thereby printing a row of ciphers after the printing of the figures of a subtotal.

14. In a machine of the class described, the combination with an accounting device, of a drive shaft therefor, a notched disk fast to said drive shaft, a motor driven gear concentric with said shaft, a spring pressed pawl pivoted on the gear and engaging the notch in said disk, a pivoted frame, a pinion journaled in said frame and constructed to be connected to said gear, a roller eccentrically mounted on said pinion and properly positioned to engage a projecting tail of the pawl and thereby disengage the pawl, and means for rocking said frame to carry the pinion into and out of connection with said gear.

15. In a machine of the class described, the combination with an accounting device, of a driving shaft therefor, a motor driven element, a clutch to connect the driving shaft and said element, means for disabling said clutch, a second clutch connecting the disabling means to the driving shaft, and manipulative means for controlling the second clutch and thereby the disabling of the first clutch.

16. In a machine of the class described, the combination with an accounting device, of a driving shaft therefor, a motor driven element, a clutch to connect the driving shaft and said element, an auxiliary shaft, a clutch connecting the auxiliary shaft and the driving shaft, means carried by the auxiliary shaft for disabling the first mentioned clutch, and manipulative means for controlling the second clutch and thereby the disabling of the first clutch.

17. In a machine of the class described, the combination with a "cash balance" totalizer, of adding and subtracting racks therefor, means for causing said totalizer to move into engagement with either of said racks and constructed normally to move the totalizer into engagement with said adding racks, and a "paid out" key having connections to reverse said moving means whereby to cause said totalizer to move into engagement with said subtracting rack.

18. In a machine of the class described, the combination with a totalizer and an operating rack therefor, of a pitman constructed to move said totalizer into engagement with said rack on each operation of the machine, a device having an invariable extent of movement and normally connected to drive said pitman, and a key having connections to disconnect said pitman from said driving device.

19. In a machine of the class described, the combination with a totalizer and an operating rack therefor, of a pitman constructed normally to move said totalizer into engagement with said rack at each operation of the machine, means for operating said pitman, a key, and means actuated thereby for disconnecting said pitman from said operating means.

20. In a machine of the class described, the combination with a totalizer and an operating rack therefor, of a pitman constructed normally to move said totalizer into engagement with said rack at each operation of the machine, means for operating said pitman, and means operable as a preliminary to an operation of the machine to disconnect said pitman from said operating means.

21. In a machine of the class described, the combination with a totalizer and an operating rack therefor, of a pitman constructed to move said totalizer into engagement with said rack, a device having an invariable extent of movement and connected to drive said pitman, and manipulative means having connections to disconnect said pitman from said driving device.

22. In a machine of the class described the combination with a totalizer and an operating rack therefor, of a pitman constructed to move said totalizer into engagement with said rack at each operation of the machine, a device having an invariable extent of movement and connected to drive said pitman, and means having connections to disconnect said pitman from said driving device as a preliminary to an operation of the machine.

23. In a machine of the class described, the combination with a main operating mechanism for the machine, of a plurality of accounting devices each comprising a plurality of accounting elements, a shaft carrying all of said devices and constructed to reset all of said devices by its rotation, normally disabled gear connections intermediate said shaft and main operating mechanism, manipulative means for enabling said gear connections, means for maintaining said gear connections during a portion of the operation of the main operating mechanism, and means for again disabling said gear connections at the completion of an operation of the machine.

24. In a machine of the class described, the combination with a cash balance totalizer, of adding and subtracting racks therefor, means for normally holding said totalizer out of engagement with both of said racks, means for causing said totalizer to move into engagement with either of said racks at each operation of the machine, and constructed normally to move the totalizer into engagement with said adding rack, and a paid out key having connections to reverse said moving means whereby to cause said totalizer to move into engagement with said subtracting rack.

25. In a machine of the class described, the combination with a cash balance totalizer, of adding and subtracting racks therefor, means for causing said totalizer to be moved into engagement with either of said racks and constructed normally to move the totalizer into engagement with said adding racks at each operation of the machine, and manipulative means having connections to reverse said moving means whereby to cause said totalizer to be moved into engagement with said subtracting racks upon the operation of the machine immediately following the manipulation of said manipulative means.

26. In a machine of the class described, the combination with a cash balance totalizer, of adding and subtracting racks therefor, means for causing said totalizer to move into engagement with either of said racks at each operation of the machine, and constructed normally to move the totalizer into engagement with the adding racks, manipulative means having connections to reverse said moving means whereby to cause said totalizer to move into engagement with said subtracting racks, and additional manipulative means for entirely disabling said moving means.

27. In a machine of the class described, the combination with an accounting device, of operating mechanism therefor, said device being normally disengaged from its operating mechanism, a pitman normally effective to establish engagement between the operating mechanism and the accounting device at each operation of the machine, and manipulatively operable means for rendering said pitman ineffective during an operation.

28. In a machine of the class described, the combination with an accounting device, of driving elements therefor, an invariably moved device, a pitman normally forming a driving connection between the invariably moved device and the accounting device to engage the latter with its driving elements, and manipulative means for disabling said pitman as a preliminary to an operation of the machine.

29. In a machine of the class described, the combination with a main operating mechanism for the machine, of a plurality of accounting devices each comprising a plurality of elements, a shaft common to all of said elements and arranged to set all of the elements to zero by its rotation, a gear rigid on the shaft and a gear invariably driven by the driving mechanism, a broad toothed pinion adapted to engage both of said gears but normally out of engagement, a manually adjustable slide, and means whereby adjustment of the slide will engage the pinion with the gears to establish a driving connection between the gears.

30. In a machine of the class described, the combination with a "cash" totalizer and a "paid out" totalizer, of a "cash balance" totalizer to show the difference between the amounts entered on the "cash" and the "paid out" totalizers, item entering mechanism for operating said totalizers, mechanism for operating the totalizers one at a time to take totals, and manipulative devices controlling both of said mechanisms.

31. In a machine of the class described, the combination with a totalizer, of adding and subtracting racks therefor, means whereby the totalizer may be engaged with either set of racks, manipulative devices controlling the engagement of the totalizer and the racks, and other manipulative devices for disabling the engaging means.

32. In a machine of the class described, the combination with a totalizer, of adding and subtracting racks therefor, a pitman for engaging the totalizer with either set of racks, a rock shaft, means carried thereby for reciprocating the pitman in either direction, manipulative devices controlling said pitman, and other manipulative devices for disabling said pitman.

In testimony whereof I affix my signature in the presence of two witnesses.

HAAKON A. MARTIN.

Witnesses:
R. C. GLASS,
CARL W. BEUST.